(12) United States Patent
Yoo

(10) Patent No.: US 12,187,317 B2
(45) Date of Patent: Jan. 7, 2025

(54) DRIVER ASSISTANCE SYSTEM TO PREVENT COLLISION AND A VEHICLE TO PREVENT COLLISION

(71) Applicants: Hyundai Motor Company, Seoul (KR); Kia Corporation, Seoul (KR)

(72) Inventor: Jeong-Jae Yoo, Gyeonggi-do (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 251 days.

(21) Appl. No.: 17/885,734

(22) Filed: Aug. 11, 2022

(65) Prior Publication Data

US 2023/0055919 A1    Feb. 23, 2023

(30) Foreign Application Priority Data

Aug. 18, 2021   (KR) .................. 10-2021-0108478

(51) Int. Cl.
   *B60W 60/00*    (2020.01)
   *B60Q 1/50*    (2006.01)
   (Continued)

(52) U.S. Cl.
   CPC ......... *B60W 60/0015* (2020.02); *B60Q 1/525* (2013.01); *B60R 25/24* (2013.01);
   (Continued)

(58) Field of Classification Search
   CPC .. B60W 2552/50; B60W 40/08; B60W 50/10; B60W 30/08; B60W 10/06; B60W 10/08; B60W 10/26; B60W 40/06; B60W 60/001; B60W 60/0015; B60W 10/04; B60W 10/18; B60W 10/20; B60W 30/06; B60W 30/09; B60W 50/14; B60W 2050/143; B60W 2420/403;
   (Continued)

(56) References Cited

U.S. PATENT DOCUMENTS

2017/0123423 A1* 5/2017 Sako ............... B60N 2/003
2017/0126810 A1* 5/2017 Kentley ............. G06Q 30/0601
(Continued)

OTHER PUBLICATIONS

Dey, Debargha, Matviienko, Andrii, Berger, Melanie, Pfleging, Bastian, Martens, Marieke and Terken, Jacques. "Communicating the intention of an automated vehicle to pedestrians: The contributions of eHMI and vehicle behavior" it—Information Technology, vol. 63, No. 2, 2021, pp. 123-141. (Year: 2021).*

*Primary Examiner* — Russell Frejd
*Assistant Examiner* — Ana D Thomas
(74) *Attorney, Agent, or Firm* — Fox Rothschild LLP

(57) ABSTRACT

An advanced driver assistance system is provided. The advanced driver assistance system of the vehicle comprises a communicator configured to communicate with an obstacle detector configured to detect an obstacle; and a processor configured to determine a riding intention of a user in response to reception of a door unlocking instruction, obtain location information of other vehicles based on obstacle information detected by the obstacle detector in response to determining that the riding intention exists, determine a collision possibility with other vehicles based on the location information of other vehicles, and control output of notification information for a collision in response to determining that the collision possibility exists.

17 Claims, 32 Drawing Sheets

(51) Int. Cl.
  *B60R 25/24*    (2013.01)
  *B60R 25/31*    (2013.01)
  *B60W 10/04*    (2006.01)
  *B60W 10/18*    (2012.01)
  *B60W 10/20*    (2006.01)
  *B60W 30/06*    (2006.01)
  *B60W 30/09*    (2012.01)
  *B60W 50/14*    (2020.01)

(52) U.S. Cl.
  CPC ............ *B60R 25/31* (2013.01); *B60W 10/04* (2013.01); *B60W 10/18* (2013.01); *B60W 10/20* (2013.01); *B60W 30/06* (2013.01); *B60W 30/09* (2013.01); *B60W 50/14* (2013.01); *B60W 2050/143* (2013.01); *B60W 2420/403* (2013.01); *B60W 2554/404* (2020.02); *B60W 2556/40* (2020.02); *B60W 2556/65* (2020.02)

(58) Field of Classification Search
  CPC ....... B60W 2554/404; B60W 2556/40; B60W 2556/65; B60W 2050/0005; B60W 2050/0064; B60Q 1/525; B60Q 2800/10; B60Q 1/46; B60Q 5/006; B60R 25/24; B60R 25/31
  See application file for complete search history.

(56) References Cited

U.S. PATENT DOCUMENTS

2018/0182247 A1\* 6/2018 Baba .................. G06V 20/58
2020/0207338 A1\* 7/2020 Cho ................... B60W 30/09

\* cited by examiner

DRIVER ASSISTANCE SYSTEM TO PREVENT COLLISION AND A VEHICLE TO PREVENT COLLISION

CROSS-REFERENCE TO RELATED APPLICATION(S)

This application claims, under 35 U.S.C. § 119(a), the benefit of Korean Patent Application No. 10-2021-0108478, filed on Aug. 18, 2021, the entire contents of which are incorporated herein by reference in its entirety.

BACKGROUND

Technical Field

Embodiments of the present disclosure relate to an advanced driver assistance system for preventing collision with an obstacle and a vehicle having the same.

Description of the Related Art

Recently, the development of various advanced driver assistance systems (ADAS) has been ongoing in order to prevent accidents caused by a driver's carelessness. The ADAS may deliver driving information of a vehicle to a driver and provide guidance information for the driver's convenience.

For example, technologies that detect obstacles around a vehicle by mounting a distance sensor on the vehicle to alert the driver are known.

As another example, cruise control technologies that allow a vehicle to travel while adjusting constantly a driving speed of the vehicle are known.

As another example, autonomous driving technologies that autonomously drive to a destination based on road information and current location information are known. In particular, autonomous driving technologies detect obstacles and autonomously drive to a destination while avoiding the detected obstacles.

Such a conventional ADAS controls collision avoidance with obstacles and autonomous driving in a state on which a user is riding. However, the conventional ADAS does not operate when the user gets off the vehicle or when the engine of the vehicle is turned off, so that uses of ADAS technologies are limited.

SUMMARY

An object of the present disclosure provides an advanced driver assistance system configured to determine a possibility of collision with an obstacle in response to a riding intention of a user, and configured to output notification information for the possibility of collision with the obstacle, and a vehicle having the same.

Another object of the present disclosure provides an advanced driver assistance system configured to determine a possibility of collision with an obstacle in a riding state in response to determining that the user's riding intention is present, and controlling an autonomous driving and autonomous parking to a safe riding area in response to the possibility of collision with the obstacle, and a vehicle having the same.

Additional objects of the present disclosure will be set forth in part in the description which follows and, in part, will be obvious from the description, or may be learned by practice of the disclosure.

In accordance with an object of the present disclosure, an advanced driver assistance system may comprise a communicator configured to communicate with an obstacle detector that detects an obstacle; and a processor configured to determine a riding intention of a user in response to reception of a door unlocking instruction, obtain location information of one or more other vehicles based on obstacle information detected by the obstacle detector in response to determining that the user's riding intention exists, determine a collision possibility with the one or more other vehicles based on the location information of the one or more other vehicles, and control output of notification information for a collision in response to determining that the collision possibility exists.

The communicator may be configured to communicate with at least one of a remote controller and a terminal, and receive the door unlocking instruction from the at least one of the remote controller and the terminal.

The communicator may be configured to receive current location information, and perform communication with an image obtainer that obtains a surrounding image, and the processor may further be configured to obtain surrounding environment information based on the received current location information, pre-stored map information, and image information for the surrounding image, determine a parking environment state based on the obtained surrounding environment information, and determine the collision possibility with the one or more other vehicles based on the parking environment state and the location information of the one or more other vehicles.

The processor may further be configured to determine whether a current location is a parking lot or a road based on the received current location information and the pre-stored map information, obtain the surrounding environment information of the parking lot based on the image information for the surrounding image and the map information in response to determining that the current location is the parking lot, and obtain the surrounding environment information of the road based on the image information for the surrounding image and the map information in response to determining that the current location is the road.

The communicator may be configured to perform communication with at least one of a remote controller and a terminal, and the processor may further be configured to obtain user's location information based on at least one of a received signal strength when communicating with the remote controller and a received signal strength when communicating with the terminal, obtain user's moving route information based on the user's location information, obtain driving route information of other vehicles based on the location information of other vehicles, and determine the collision possibility with other vehicles based on the user's moving route information and the driving route information of other vehicles.

The processor may further be configured to transmit the notification information for the collision to the terminal in response to determining that the collision possibility exists.

The processor may further be configured to, in response to determining that the collision possibility with other vehicles exists, recognize a safe riding area based on the received current location information, the pre-stored map information and the image information for the surrounding image, and control autonomous driving and autonomous parking to be moved to the recognized safe riding area.

The communicator may be configured to communicate with other vehicles and a server, and receive the location information of other vehicles from other vehicles or receive the location information of other vehicles from the server.

In accordance with an object of the present disclosure, a vehicle may be provided. The vehicle may comprise a door; an obstacle detector configured to detect an obstacle; an image obtainer configured to obtain a surrounding image; a communicator configured to perform communication with at least one of a remote controller and a terminal; a processor configured to obtain location information of other vehicles based on obstacle information detected by the obstacle detector in response to determining that a unlocking instruction of the door is received through the communicator, determine a collision possibility with other vehicles based on the location information of other vehicles and image information for the surrounding image, and control output of notification information for a collision in response to determining that the collision possibility exists; a lamp configured to turn on or flicker in response to a control instruction of the processor; and a sound outputter configured to output a sound in response to a control instruction of the processor.

The communicator may be configured to receive current location information, and the processor may be configured to obtain surrounding environment information based on the received current location information, pre-stored map information, and the image information for the surrounding image, determine a parking environment state based on the obtained surrounding environment information, and determine the collision possibility with other vehicles based on the parking environment state and the location information of other vehicles.

The processor may further be configured to determine whether a current location is a parking lot or a road based on the received current location information and the pre-stored map information, obtain the surrounding environment information of the parking lot based on the image information for the surrounding image and the map information in response to determining that the current location is the parking lot, and obtain the surrounding environment information of the road based on the image information for the surrounding image and the map information in response to determining that the current location is the road.

The processor may further be configured to obtain user's location information based on a received signal strength when communicating with the remote controller, generate moving route information of the user based on the obtained user's location information and the surrounding environment information, generate driving route information of other vehicles based on the location information of other vehicles and the surrounding environment information, and determine the collision possibility with other vehicles based on the moving route information of the users and the driving route information of other vehicles.

The processor may further be configured to obtain user's location information based on a received signal strength when communicating with the terminal, generate moving route information of the user based on the obtained user's location information and the surrounding environment information, generate driving route information of other vehicles based on the location information of other vehicles and the surrounding environment information, and determine the collision possibility with other vehicles based on the moving route information of the user and the driving route information of other vehicles.

The processor may further be configured to obtain location information of the terminal from the terminal when communicating with the terminal, generate moving route information of the user based on the location information of the terminal, generate driving route information of other vehicles based on the location information of other vehicles and the surrounding environment information, and determine the collision possibility with other vehicles based on the moving route information of the user and the driving route information of other vehicles.

The processor may further be configured to transmit the notification information for the collision to the terminal in response to determining that the collision possibility exists.

The vehicle may further comprise a braking device, a steering device and a power device, wherein, the processor may further be configured to, in response to determining that the collision possibility with other vehicles exists, recognize a safe riding area based on the received current location information, the pre-stored map information and the image information for the surrounding image, and control at least one of the braking device, the steering device and the power device to be moved to the recognized safe riding area.

The communicator may be configured to communicate with other vehicles and a server, and receive the location information of other vehicles from other vehicles or receive the location information of other vehicles from the server.

BRIEF DESCRIPTION OF THE DRAWINGS

These and/or other aspects of the present disclosure will become apparent and more readily appreciated from the following description of the exemplary embodiments, taken in conjunction with the accompanying drawings, of which.

DETAILED DESCRIPTION

Figure 1:
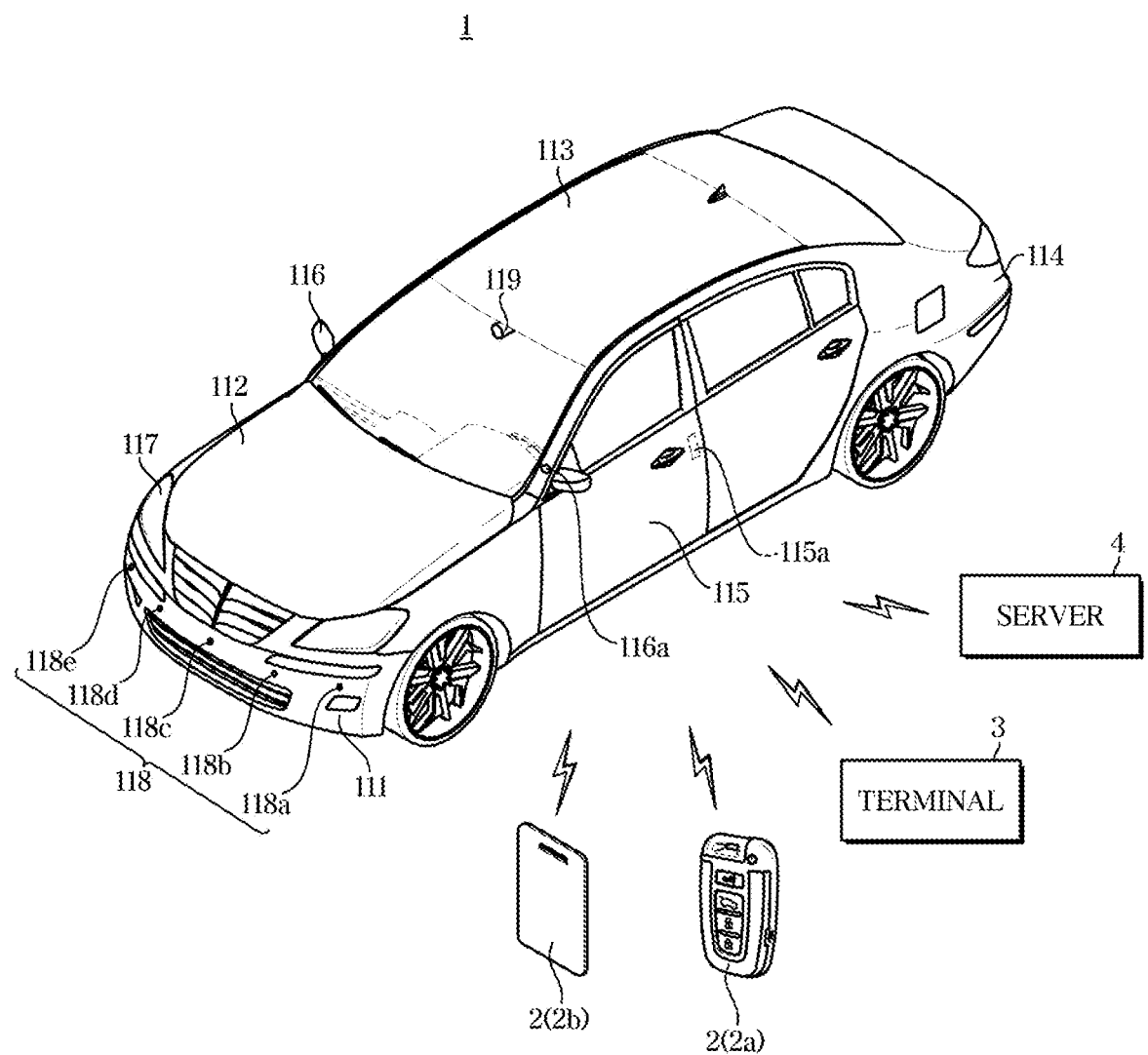
FIG. 1 is a view illustrating a vehicle according to an exemplary embodiment of the disclosure.

Like reference numerals refer to like elements throughout. The disclosure does not describe all elements of the embodiments, and overlaps between the general contents or the embodiments in the technical field to which the disclosure belongs. This specification does not describe all elements of the exemplary embodiments of the disclosure and detailed descriptions on what are well known in the art or redundant descriptions on substantially the same configurations may be omitted. The term 'part, module, member, block' used in the specification may be implemented in software or hardware, and a plurality of 'part, module, member, block' may be embodied as one component, It is also possible that one 'part, module, member, block' includes a plurality of components.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. These terms are merely intended to distinguish one component from another component, and the terms do not limit the nature, sequence or order of the constituent components. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor and is specifically programmed to execute the processes described herein. The memory is configured to store the modules and the processor is specifically configured to execute said modules to perform one or more processes which are described further below.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about".

Hereinafter, some embodiments of the present disclosure will be described in detail with reference to the exemplary drawings. In the drawings, the same reference numerals will be used throughout to designate the same or equivalent elements. In addition, a detailed description of well-known features or functions will be ruled out in order not to unnecessarily obscure the gist of the present disclosure.

Throughout the specification, when an element is referred to as being "connected to" another element, it may be directly or indirectly connected to the other element and the "indirectly connected to" includes being connected to the other element via a wireless communication network.

Furthermore, when a part is said to "include" a certain component, this means that it may further include other components, except to exclude other components unless otherwise stated.

Throughout the specification, when a member is located "on" another member, this includes not only when one member is in contact with another member but also when another member exists between the two members.

The terms first, second, etc. are used to distinguish one component from another component, and the component is not limited by the terms described above.

Singular expressions include plural expressions unless the context clearly indicates an exception.

In each step, the identification code is used for convenience of description, and the identification code does not describe the order of each step. Each of the steps may be performed out of the stated order unless the context clearly dictates the specific order.

Hereinafter, with reference to the accompanying drawings will be described the working principle and embodiments of the disclosure. Hereinafter, some embodiments of the present disclosure will be described in detail with reference to the exemplary drawings. In the drawings, the same reference numerals will be used throughout to designate the same or equivalent elements. In addition, a detailed description of well-known features or functions will be ruled out in order not to unnecessarily obscure the gist of the present disclosure.

FIG. 1 is a view illustrating a vehicle according to an exemplary embodiment of the disclosure.

According to an exemplary embodiment of the disclosure, a vehicle may be configured to perform a manual driving mode on which the vehicle is traveled corresponding to a driver's driving intention, an autonomous driving mode in which the vehicle autonomously drives from a current location to a destination based on current location information, a pre-stored map information, and destination information of the vehicle, and an autonomous parking mode in which the vehicle autonomously parks in a state in which the vehicle arrives at a destination or temporarily is stopped.

The vehicle 1 may comprise a body having an interior and exterior, and a chassis in which mechanical devices necessary for driving are installed as the remaining parts except for the body.

As shown in FIG. 1, the body of the vehicle may comprise a front panel 111, a bonnet 112, a roof panel 113, a rear panel 114, front left and right doors and rear left and right doors 115, and a window glass provided to be open and closed the doors 115.

The vehicle may further include a locking member 115a for locking and unlocking the door 115.

The body of the vehicle may comprise a pillar provided at a boundary between the window glasses of the doors, a side mirror 116 that provides a driver with a rear view of the vehicle 1, and an exterior lamp 117 that allows the driver to easily see surrounding information while keeping an eye on a front view of the vehicle and also functions as a signal and communication for one or more other vehicles and pedestrians.

Furthermore, the vehicle may further include a mirror adjusting member 116a for folding or unfolding the side mirror 116.

The vehicle 1 may comprise an obstacle detector 118 that detects an obstacle around the vehicle and detects a distance from/to the detected obstacle.

The obstacle detector 118 may be provided on at least one of the front panel 111 and the rear panel 114 of the vehicle. Furthermore, the obstacle detector 118 may be provided on a side sill panel below the door 115.

The obstacle detector 118 detects a presence of an obstacle and a position of the obstacle in forward, backward, left, and right directions based on a position of the own vehicle. Herein, the position of the obstacle may include a relative distance and a relative direction with the vehicle.

More specifically, the obstacle detector 118 detects an obstacle located outside the own vehicle, for example, a preceding vehicle traveling in front of the own vehicle, a stationary object such as a structure installed around a road, an opposing vehicle approaching from the opposite direction, and pedestrians.

In other words, the obstacle detector 118 outputs detection information of the obstacle located the front, rear, and left and right sides of the own vehicle.

The obstacle detector 118 may include a Radio Detecting and Ranging (RaDAR) sensor or a Light Detection and Ranging (LiDAR) sensor.

The RaDAR sensor is a sensor that detects a position and distance of an object by using a reflected wave generated by radiation of radio waves when transmission and reception are performed in the same place.

The LiDAR sensor is a non-contact distance detection sensor using the principle of laser radar.

Such a LiDAR sensor has higher detection accuracy in a lateral direction than the RaDAR sensor, so that the accuracy of the process of determining whether a passage exists forward may be increased.

The obstacle detector 118 may include an ultrasonic sensor or laser sensor.

The ultrasonic sensor generates ultrasonic waves for a certain period of time and then detects a signal that is reflected back from an object.

The ultrasonic sensor may be used to determine existence of an obstacle, such as a pedestrian, within a short-range.

The vehicle may further include an image obtainer 119 for obtaining an image of surrounding environments.

The image obtainer 119 is a device for obtaining an image, and may include a Charge Coupled Device (CCD) or a complementary metal-oxide-semiconductor (CMOS) image sensor, and may include a camera using infrared rays.

The image obtainer 119 may be provided around a driver seat, and a field of view thereof may be provided to face the outside of the vehicle to obtain an image of the outside of the vehicle.

The image obtainer 119 may be provided on any one of the front windshield glass, a rearview mirror inside the vehicle, the roof panel, or the front panel.

The image obtainer 119 may be rotatably provided to change a field of view of the camera. The image obtainer 119 may rotate in a direction corresponding to a user position that the user is recognized.

The image obtainer 119 detects object information around the vehicle to convert into an electrical image signal. In other words, the image obtainer 119 detects the object information on the front side, left and right sides of the own vehicle and transmits the image signal of the detected object information into a processor 160.

The image obtainer 119 may be a rear view camera, a camera of a black box, a camera of an autonomous driving control device provided for autonomous driving, or a camera for a user authentication.

The interior of the vehicle may include a seat on which an occupants sits, a dashboard, an inputter for receiving a user input, and a display for displaying operation information of at least one electrical devices, and the inputter and the display may be provided on a head unit.

The chassis of the vehicle is a frame for supporting the vehicle body, and may include a power device, a braking device, and a steering device for applying driving force, braking force, and steering force to four wheels such as FL, FR, RL, RR wheels, and further comprises a suspension device, a transmission device, and the like.

As shown in FIG. 1, the vehicle 1 may communicate with at least one of a remote controller 2, a terminal 3, and a server 4.

Figure 2:
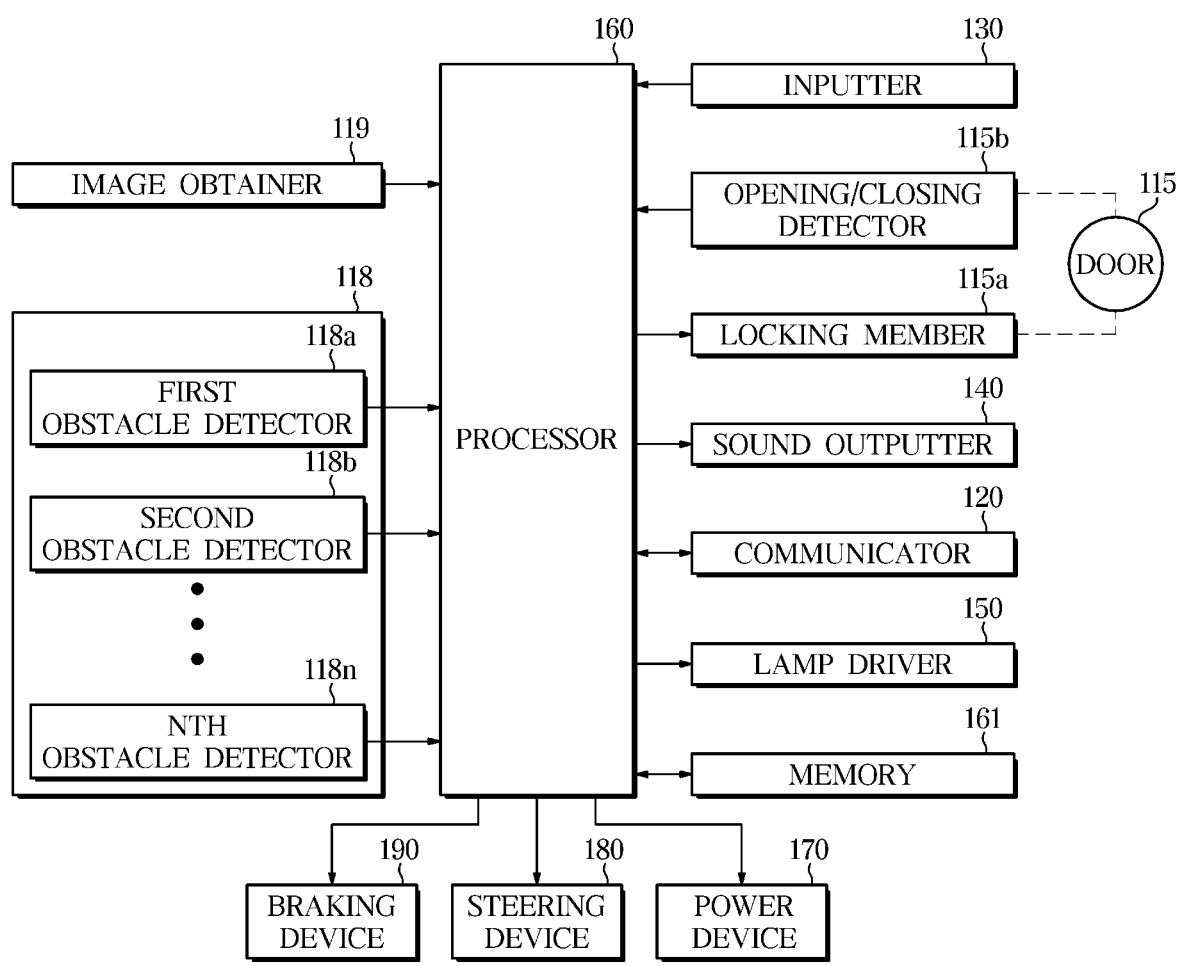
FIG. 2 is a control configuration view illustrating a vehicle according to an exemplary embodiment of the disclosure.

FIG. 2 is a control configuration diagram illustrating a vehicle according to an exemplary embodiment of the disclosure.

The vehicle may comprise the locking member 115a, the obstacle detector 118, the image obtainer 119, a communicator 120, an inputter 130, a sound outputter 140, a lamp driver 150, a processor 160, and a memory 161, and may further comprise a power device 170, a steering device 180, and a braking device 190.

The locking member 115a may be provided on each door 115, and may operate the locking member in response to a control command from the processor 160 to allow the door to be in a locked state or the door to be in an unlocked state.

The locking member 115a may maintain the door in the unlocked state so that the door may be open and closed, or maintain in the locked state so that the door may not be open and closed.

The locking member 115a may include an actuator for locking and unlocking the door.

An opening/closing detector 115b may be provided in each door to generate a detection signal corresponding to the opening and closing of each door.

The opening/closing detector 115b may be configured to detect an open state according to the opening of the door and output an open signal corresponding to the opened state of the door, and detect a closed state according to the closing of the door and output a closed signal corresponding to the closing of the door.

The obstacle detector 118 transmits detection information regarding an obstacle detection to the processor 160.

The image obtainer 119 obtains an image around the vehicle for recognizing the surrounding environments of the vehicle. The image around the vehicle may be a road environment image and a parking lot environment image.

The communicator 120 communicates with at least one external device among the remote controller 2, the user terminal 3 and the server 4.

In addition to the external device, the communicator 120 may include one or more components that enable communication with components inside the vehicle, and may include, for example, at least one of a short-range communication module, a wired communication module, and a wireless communication module.

The short-distance communication module may include various short-distance communication modules that transmit and receive signals in the short-range, for example, a Bluetooth (BLU) module, infrared communication module, a Radio Frequency Identification (RFID) communication module, a Wireless Local Access Network (WLAN) communication module, a Near Field Communication (NFC) module, a Zigbee communication module, and the like.

The wired communication module may include various wired communication modules such as, a Controller Area Network (CAN) communication module, a Local Area Network (LAN) module, a Wide Area Network (WAN) module, or a Value Added Network (VAN) module, and various cable communication such as, a Universal Serial Bus (USB), a High Definition Multimedia Interface (HDMI), a Digital Visual Interface (DVI), a Recommended Standard 232 (RS-232), a power line communication, or a Plain Old Telephone Service (POTS).

The wired communication module may further include a Local Interconnect Network (LIN).

The wireless communication module may include a Wi-Fi module and a wireless broadband (WiBro) module, in addition to a wireless communication module for supporting various wireless communication manners such as, a Global System for Mobile communication (GSM), a Code Division Multiple Access (CDMA), a Wideband Code Division Multiple Access (WCDMA), a Universal Mobile Telecommunications System (UMTS), a Time Division Multiple Access (TDMA), a Long Term Evolution (LTE), and a Ultra Wide Band (UWB) module.

The communicator 120 may be configured to use different communication modules according to external devices that communicate with the vehicle.

As an example, the communicator 120 of the vehicle 1 may include at least one of a low-frequency communication module and a high-frequency communication module for communicating with the remote controller 2.

The low-frequency communication module may be a communication module for transmitting and receiving a low-frequency (LF) signal, and the high-frequency communication module may be a communication module for receiving a radio frequency (RF) signal transmitted from the remote controller.

As another example, the communicator 120 of the vehicle may be configured to use any one or two or more of the BLU module, the UWB module, or the NFC module when communicating with the terminal 3.

The communicator 120 may further include a location receiver.

The location receiver receives location information corresponding to a current location of the vehicle.

Such a location receiver may include a Global Positioning System (GPS) receiver. Herein, the GPS receiver may comprise an antenna module for receiving signals from a plurality of GPS satellites and a signal processing module.

The signal processing module may comprise a software for obtaining a current location by using distance and time information corresponding to location signals of the plurality of GPS satellites, and a transmitter for transmitting the obtained vehicle location information.

The vehicle 1 may be configured to perform a Vehicle-to-Infrastructure (V2I) communication with infrastructures (not shown). Furthermore, the vehicle 1 may be configured to perform a Vehicle-to-Vehicle (V2V) communication with one or more other vehicles.

The inputter 130 receives a user input.

The inputter 130 may be configured to receive destination information when an autonomous driving mode or a navigation mode is performed.

The inputter 130 may be configured to receive an ignition turn-on instruction and an ignition turn-off instruction, and may be configured to receive a parking instruction.

The inputter for receiving the parking instruction may include an electronic parking brake button, a parking button, and a shift lever.

The inputter 130 may be configured to receive an opening/closing instruction to at least one door, a locking/unlocking instruction to at least one door.

The inputter 130 may be configured to also receive an on and off instructions of a safe riding mode.

The sound outputter 140 outputs a sound in response to a control instruction of the processor 160, and specifically outputs the sound at a level corresponding to the control instruction of the processor 160.

The sound outputter 140 may be configured to output warning information as a sound to notify a danger of collision with an obstacle. The sound outputter 140 may be a speaker or Klaxon.

The lamp driver 150 may be configured to turn on or turn off the exterior lamp 117 in response to a control instruction of the processor 160, and may be configured to also cause the exterior lamp 117 to blink.

Herein, the blinking is an operation of repeating the turning on and off at regular time intervals.

The lamp driver 150 may be configured to turn on or off a lamp (not shown) provided in the side mirror 116 in response to a control instruction from the processor 160, and may be configured to also cause the lamp of the side mirror to flicker.

The processor 160 may be configured to determine whether a user gets off based on the reception of the ignition turn-off instruction and the reception of the door opening/closing signal.

The processor 160 may be configured to determine whether the user gets off based on the reception of the door opening/closing signal, and determine whether the user gets off in response to a detection signal of an occupant detector (not shown). Herein, the occupant detector (not shown) may include a pressure sensor provided on each seat, a capacitive sensor, a belt attachment/detachment sensor, and a camera for obtaining an internal image.

The processor 160 may be configured to also determine whether the user gets off in response to the parking instruction.

The processor 160 may be configured to determine whether the user gets off in response to the reception of the opening/closing signal of the door and the reception of locking/unlocking instruction of the door.

The processor 160 may be configured to also determine whether the user gets off based on the current location information and the destination information.

The processor 160 may be configured to determine whether a user's riding intention exists in response to determining that the user is in a get-off state, which refers to the user had gotten off.

The processor 160 may be configured to determine that the user's riding intention exists in response to that the unlocking instruction of the door is received through the communicator 120. In this case, the processor 160 may be configured to determine whether the unlocking instruction of the door is received through the remote controller 2 and may be configured to determine whether the unlocking instruction of the door is received through the terminal 3.

In response to the reception of the unlocking instruction of the door, the processor 160 may be configured to communicate with the remote controller, obtain distance information with the remote controller based on the received signal strength received from the remote controller, and determine whether the user approaches the vehicle based on the obtained distance information with the remote controller.

In response to the reception of the unlocking instruction of the door, the processor 160 may be configured to communicate with the terminal 3, obtain distance information with the terminal 3 based on the received signal strength received from the terminal 3, and determine whether the user approaches the vehicle based on the obtained distance information with the terminal 3.

In response to determining that the obtained distance with the terminal 3 decreases or the obtained distance with the remote controller 2 decreases, the processor 160 may be configured to determine that the user approaches the vehicle.

The processor 160 may be configured to determine whether the user approaches based on obstacle information received by the obstacle detector 118.

The processor 160 may be configured to obtain location information of the user based on the obstacle information detected by the obstacle detector 118 in response to the reception of the unlocking instruction of the door.

The processor 160 may be configured to obtain the location information of the user based on the reception of the detection signals output from the plurality of obstacle detectors, and determine that the user approaches the vehicle based on the obtained location information of the user.

The processor 160 may be configured to obtain distance change information between each obstacle detector and the user based on the reception of the detection signals output from the plurality of obstacle detectors, and determine that the user approaches the vehicle based on the obtained distance change information.

Figure 3A:
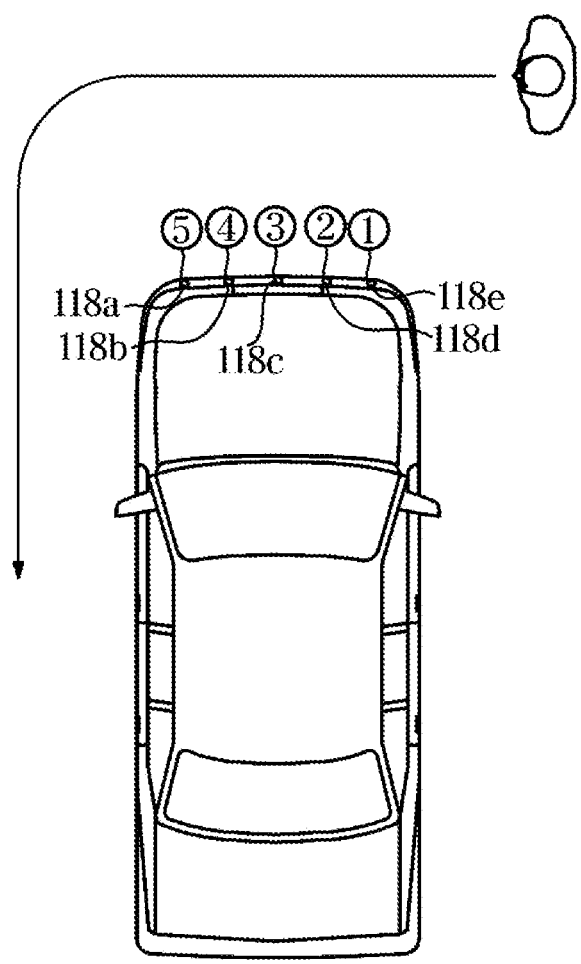
FIGS. 3A, and 3B are a view illustrating an example of recognized a user's location by an obstacle detector of a vehicle according to an exemplary embodiment of the disclosure.

As shown in FIG. 3A, when the user moves from in front of the vehicle to a driver seat side of the vehicle, the processor may be configured to first receive the detection signal output from the obstacle detector 118e provided on a right side of the front panel 111, second receive the detection signal output from the obstacle detector 118d provided between the right side and a center of the front panel 111 to which the user is next adjacent, and third receive the detection signal output from the obstacle detector 118c provided on the center of the front panel 111 to which the user is next adjacent.

The processor 160 may be configured to fourthly receive the detection signal output from the obstacle detector 118b provided between the center and a left side of the front panel, and fifthly receive the detection signal output from the obstacle detector 118a provided on the left side of the front panel.

Figure 3B:
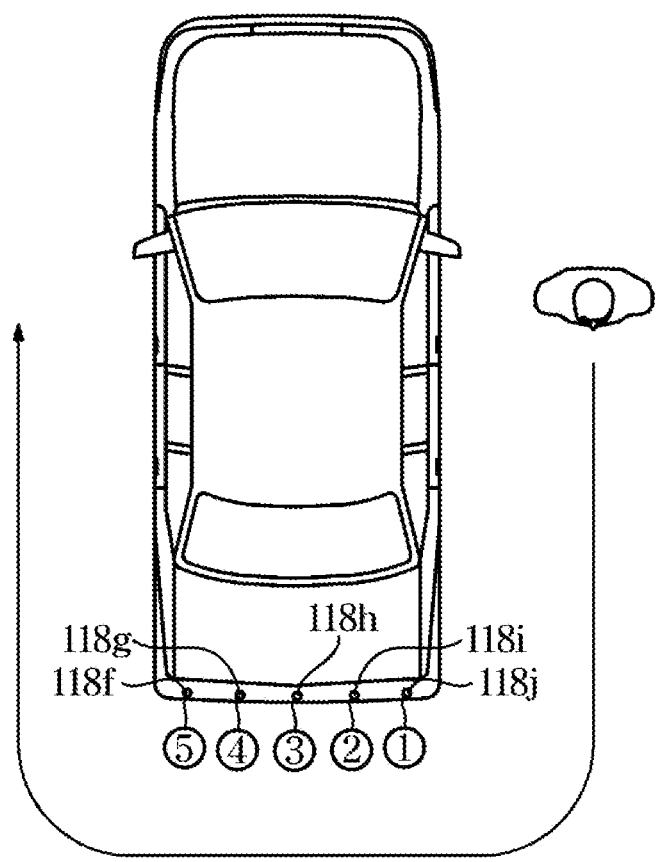

As shown in FIG. 3B, when the user moves from a rear of the vehicle to the driver seat side of the vehicle, the processor 160 may be configured to first receive the detection signal output from the obstacle detector 118j provided on a right side of the rear panel 114, second receive the detection signal output from the obstacle detector 118i provided between the right and a center of the rear panel to which the user is next adjacent, and third receive the detection signal output from the detector 118h provided on the center of the rear panel to which the user is next adjacent.

The processor 160 may be configured to fourthly receive the detection signal output from the obstacle detector 118g provided between the center and a left side of the rear panel to which the user is next adjacent, and fifthly receive the detection signal output from the obstacle detector 118f provided on the left side of the rear panel to which the user is last adjacent.

The processor 160 may be configured to obtain surrounding environment information based on image information obtained by the image obtainer 119 and recognize the user.

The processor 160 may be configured to recognize objects in the image based on the image information and obtain position information of the recognized objects.

The objects may include a street tree, a traffic light, a crosswalk, a pedestrian, other vehicles, a cyclist, a median strip, a lane, a bus stop, a taxi stand, and a road sign.

The processor 160 may be configured to determine whether the current location is a parking lot or a road based on the image information, and may be configured to also recognize other vehicles parked and/or pulled over.

The processor 160 may be configured to also obtain the surrounding environment information based on the current location information and map information received by the location receiver.

The processor 160 may be configured to determine whether the current location is a parking lot or a road based on the current location information and the map information received by the location receiver.

The processor 160 may be configured to also obtain the location information of other vehicles based on information of the other vehicles received by the communicator 120.

The processor 160 may be configured to obtain the presence of the obstacles and the location information of the obstacles based on the detection information on the obstacle detection. The location information of the obstacles may include the distance information with the obstacle and direction information regarding the obstacle.

In other words, the information of other vehicles may include identification information and location information of other vehicles.

The information of the other vehicles received by the communicator 120 may be information directly transmitted from other vehicles or information transmitted from the server 4.

The processor 160 may be configured to obtain the location information of other vehicles based on the obstacle information detected by the obstacle detector, and recognize the approach of other vehicles based on the obtained location information of other vehicles and the current location information of the vehicle.

The processor 160 may be configured to determine a possibility of collision with other vehicles based on the location information on other vehicles and the current location information on the vehicle in response to that the approach of the user is recognized in a state in which the user's riding intention exists, and control output of a notification about the possibility of a collision in response to determining that the possibility of collision with other vehicles exists.

The processor 160 may be configured to calculate a Distance to Collision (DTC) based on speed information (i.e., relative speed) of other vehicles, and determine the possibility of collision based on a result of comparison between the DTS and the distance with the user.

The processor 160 may be configured to calculate a Time to Collision (TTC) between the vehicle 1 and other vehicles based on the location information (relative distance) and speed information (relative speed) of other vehicles, and determine the possibility of collision based on a result of comparison between the TTC and a predetermined reference time.

In response to determining that the possibility of collision with other vehicles exists, the processor 160 may be configured to control lighting or flickering of the external lamps or control the sound output of the sound outputter when controlling the output of the notification regarding the possibility of collision.

In response to determining that the possibility of collision with other vehicles exists, the processor 160 may be configured to identify a safe riding area based on the surrounding environment information, and perform autonomous driving and autonomous parking control up to the identified safe riding area.

The surrounding environment information may include relative distance information of other vehicles, relative direction information, lane location information, traffic light information, and crosswalk location information corresponding to the location information of other vehicles.

The processor 160 may be configured to transmit a driving control signal, a braking control signal, and a steering control signal to the power device, the steering device, and the braking device during autonomous driving and autonomous parking control. The processor 160 may be configured to transmit the driving control signal, the braking control signal, and the steering control signal to the power device, the steering device, and the braking device via communication network (NT) for a vehicle, respectively.

The processor 160 may be a processor of an advanced driver assistance system.

The advanced driver assistance system may include the communicator 120 and the processor 160.

The processor 160 may comprise a memory (not shown) that stores data about algorithms for implementing an operation of the driver assistance device or programs for reproducing the algorithms, and a processor (not shown) that performs the above-described operation using the data stored in the memory. In this case, the memory and the processor may be implemented as separate chips. Alternatively, the memory and the processor may be implemented as a single chip.

The memory 161 may be configured to store the location information and the identification information of the plurality of obstacle detectors.

The memory 161 may be configured to store the identification information of the remote controller and the identification information of the terminal.

The memory 161 may be implemented as at least one of a nonvolatile memory device such as a cache, a read only memory (ROM), a programmable ROM (PROM), an erasable programmable ROM (EPROM), an electrically erasable programmable ROM (EEPROM), and flash memory, or a volatile memory device such as a random access memory (RAM), or a storage medium such as a hard disk drive (HDD), a compact disk (CD-ROM), but is not limited thereto.

The power device 170 may be a device that generates driving force for a vehicle. In the case of an internal combustion engine vehicle, the power device may include an engine and an engine controller. In the case of an eco-friendly vehicle, the power device may include a motor, a battery, a motor controller, and a battery management device.

In the case of an internal combustion engine vehicle, the power device may be configured to control the engine in response to the driver's intention to accelerate through an accelerator pedal. For example, the engine controller may be configured to control a torque of the engine.

The steering device 180 may be a device that changes a traveling direction of the vehicle.

The steering device 180 may be configured to change the traveling direction in response to the driver's intention to steer through a steering wheel. Such a steering device may include an electronic steering controller, and the electronic steering controller may be configured to decrease steering force during low-speed driving or parking and increase steering force during high-speed driving.

The braking device 190 may be a device that generates braking force in the vehicle.

The braking device 190 may be configured to decelerate the vehicle 1 or stop the vehicle 1 through friction with the wheels.

The braking device may include an electronic braking controller. The electronic braking controller may be configured to control braking force in response to the driver's intention to brake via the brake pedal and/or a slip of the wheels. For example, the electronic brake controller may be configured to temporarily release the braking of the wheels in response to the slip of the wheels detected while braking of the vehicle 1, which typically refers to an Anti-lock Braking Systems (ABS).

The electronic brake controller may be configured to selectively release the braking of the wheels in response to oversteering and/or understeering detected while steering of the vehicle 1, which typically refers to an Electronic stability control (ESC).

Furthermore, the electronic brake controller may be configured to temporarily brake the wheels in response to the slip of the wheels detected while driving of the vehicle 1, which typically refers to a Traction Control System (TCS).

Hereinafter, the remote controller, the user terminal and the server, which that communicate with the vehicle, will be described.

As shown in FIG. 1, the remote controller 2 may include a Fob-type remote controller 2a and a Card-type remote controller 2b, and also perform two-way communication with the vehicle 1.

The remote controller 2a and 2b (2) automatically communicates with the vehicle via at least one antenna among a plurality of antennas when locating closes to the vehicle from outside the vehicle. In this time, the remote controller transmits a remote key authentication signal for automatically communicating with the vehicle 1 via the at least one antenna in response to that a signal is received from the vehicle.

Herein, the remote key authentication signal of the remote controller is a signal for authenticating the remote controller 2, and may include a signal for identification information of the remote controller 2 and a strength signal corresponding to the received signal strength of the antenna of the remote controller 2.

The Fob-type remote controller 2a transmits a control signal corresponding to the user input to the vehicle 1 in response to that the user input is received from the user after successful remote key authentication.

The Card-type remote controller 2b, without a separate manual operation when the remote key authentication is successful, may be configured to transmit a control signal for unlocking the door on the driver seat side and front passenger seat side of the vehicle or transmit a control signal for starting the vehicle.

The Fob-type remote controller 2a and the Card-type remote controller 2b may include a low-frequency antenna for transmitting and receiving a low-frequency signal of the vehicle 1, and a high-frequency antenna for transmitting and receiving a high-frequency signal.

The remote controller 2 may be configured to transmit a control signal to turn on the lights of the vehicle or to perform the unfolding of the side mirror 160 in response to that the remote controller 2 is positioned close to the vehicle after successful remote key authentication.

In other words, the remote controller 2, in addition to the remote key authentication signal, may be configured to further transmit at least one of a door unlock control signal, an ignition on control signal, a light on control signal, and a folding control signal of the side mirror.

The user terminal 3 (or referred to as terminal) may be configured to perform user registration through an application, and may be configured to receive and store an electronic key (or digital key) of the vehicle. Herein, the electronic key may include vehicle control right information. In the electronic key, information on the terminal for user and information on the vehicle may be stored.

For example, the user terminal 3 may be configured to switch the door of the vehicle to the locked state or unlocked state by remotely controlling the state of the locking member using the stored electronic key, control operations of various electrical devices provided in the vehicle by using the stored electronic key, and control starting of the vehicle.

The user terminal 3 communicates with the vehicle 1, and further receives, through a user input, at least one of a door locking and unlocking instruction, a tailgate locking and unlocking instruction and a lamp turn on and turn off instruction. Furthermore, the user terminal 3 transmits a control signal corresponding to the received user input to the vehicle 1.

The user terminal 3 may be configured to display door locking completion or failure information corresponding to the door locking instruction, display door unlocking completion or failure information corresponding to the door unlocking instruction, display lamp lighting completion or failure information corresponding to the lamp turn on instruction transmitted to the vehicle, or display the remaining time until the lamp turns off.

The user terminal 3 may be configured to also store the identification information of the vehicle in response to that terminal registration completion information is received from the vehicle.

The user terminal 3 attempts to establish a communication connection with the vehicle in response to performing the function of the electronic key (or digital key) of the vehicle.

The user terminal 3 of the embodiment may be configured to communicate with the vehicle 1 via at least one of a Bluetooth Low Energy (BLE) module, the UWB module, and the NFC module.

The user terminal 3 may include an application (i.e., an app) for performing a vehicle digital key function.

The user terminal 3 may be implemented as a computer or a portable terminal that may be connected to the vehicle via networks.

Herein, the computer may comprise, for example, a notebook equipped with a web browser, a desktop, a laptop, a tablet personal computer (PC), a slate PC, and the like. The portable terminal may comprise, as a wireless communication device that ensures portability and mobility, for example, all kinds of handheld-based wireless communication devices including a Personal Communication System (PCS), a Global System for Mobile communications (GSM), a Personal Digital Cellular (PDC), a Personal Handyphone System (PHS), a Personal Digital Assistant (PDA), an International Mobile Telecommunication (IMT)-2000, CDMA-2000, W-CDMA, WiBro terminals, and the like, and wearable devices such as, smart phones, rings, bracelets, anklets, necklaces, glasses, contact lenses, or head-mounted-devices (HMDs) and the like.

The server 4 may be configured to store user information, vehicle terminal information, and vehicle information.

The user information may be identification information of a user registered in the server 4, fingerprint information of a user registered in the server 4, or identification information of the user terminal 3 possessed by the registered user.

Herein, the identification information of the user registered in the server 4 or the identification information of the user terminal 3 is information registered through an application (app) installed in the vehicle terminal or the user terminal 3.

Furthermore, the user information may include a user's name registered in the server 4, a user's home address, a user's email address, a user's resident registration number, a date of birth, a user's driver license, and the like.

The identification information of the user terminal 3 is unique identification information possessed by the user terminal 3 that is distinguished from other terminals, and may include at least one of a phone number of the terminal, a WIFI MAC address of the terminal, a serial number, and an international mobile equipment identity code (IMEI).

The identification information of the user terminal 3 may be Bluetooth identification information (BTID).

The vehicle information may include a vehicle type, a model type, identification information (or referred to as license plate) of the vehicle, a power generation method (e.g., hybrid, electronic, internal combustion engine, hydrogen, etc.), a shift method, and the like.

The server 4 communicates with the vehicle terminal and the user terminal 3, and communicates with the vehicle 1.

The server 4 may be configured to allow the user to control the starting of the vehicle through the user terminal 3 based on the information of the electronic key received through the user terminal 3.

Meanwhile, each component illustrated in FIG. 2 may refer to software and/or hardware components such as a Field Programmable Gate Array (FPGA) and an Application Specific Integrated Circuit (ASIC).

Figure 4:
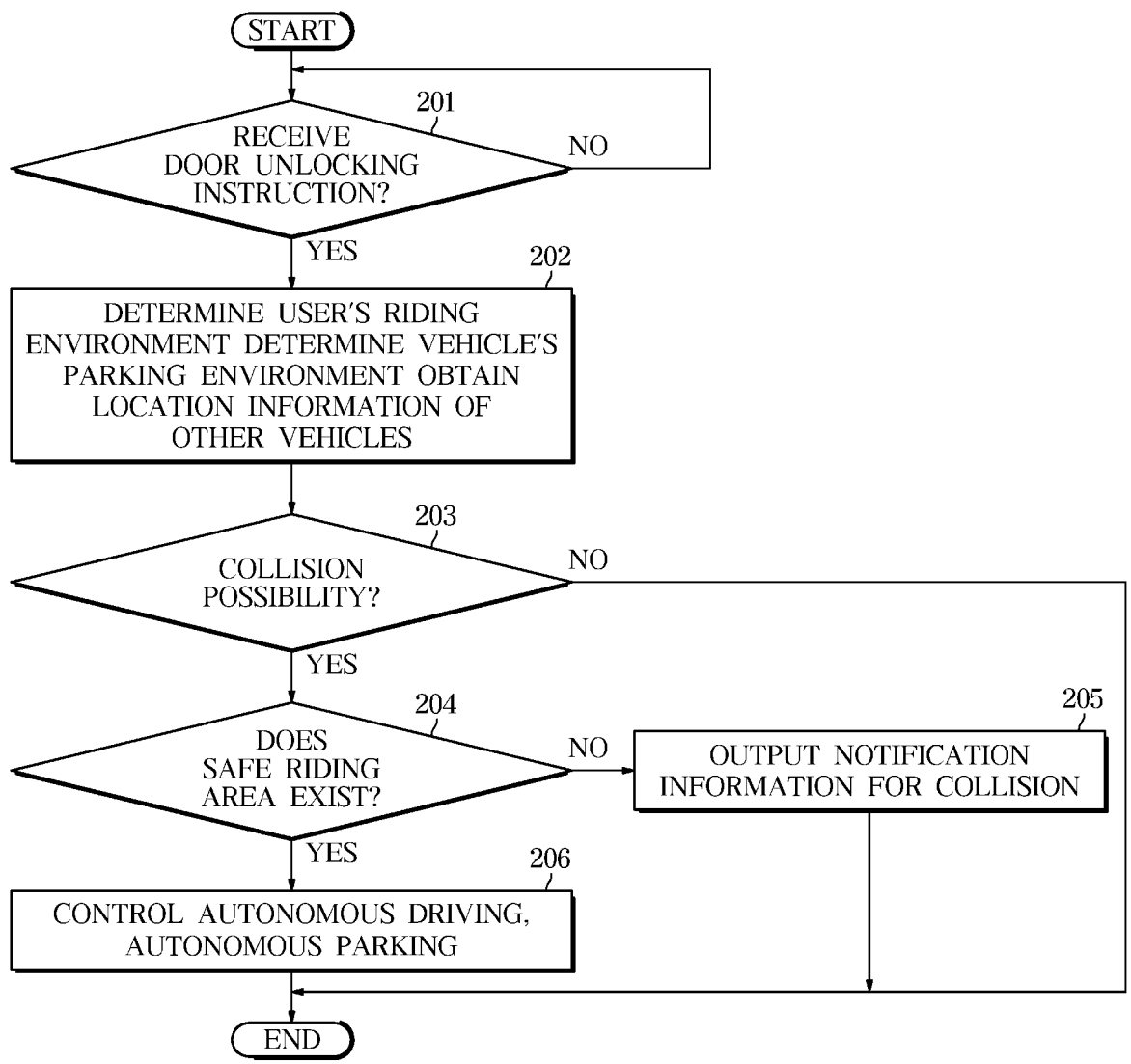
FIG. 4 is a control flowchart illustrating a vehicle according to an exemplary embodiment of the disclosure.

FIG. 4 is a control flowchart illustrating a vehicle according to an exemplary embodiment of the disclosure.

The vehicle determines whether the user's riding intention exists in response to determining that the vehicle is in a state in which the user had gotten off.

When determining the user's riding intention exists, the vehicle may be configured to determine based on whether the door unlocking instruction is received.

In other words, the vehicle may be configured to determine whether the door unlocking instruction is received (in operation 201), and determine that the user's riding intention exists in response to determining that the door unlocking instruction is received.

In response to determining that the user's riding intention exists, the vehicle may be configured to determine user's riding environments, determine vehicle's parking environments, obtain location information of other vehicles (in operation 202), and determine the possibility of collision with other vehicles based on the user's riding environments, the vehicle's parking environments and the location information of other vehicles (in operation 203)

Herein, the user's riding environments, the vehicle's parking environments and the location information of other vehicles may be simultaneously obtained.

The user's riding environments, the vehicle's parking environments and the location information of other vehicles may be sequentially obtained.

The determination of the user's riding environments, the determination of the vehicle's parking environments and the obtaining of the location information of other vehicles will be described with reference to FIGS. 5A, 5B, 5C, 5D, 5E, 6A, 6B, 6C, 6D, 6E, 7A, 7B, 7C, 7D and 7E.

Figure 5A:
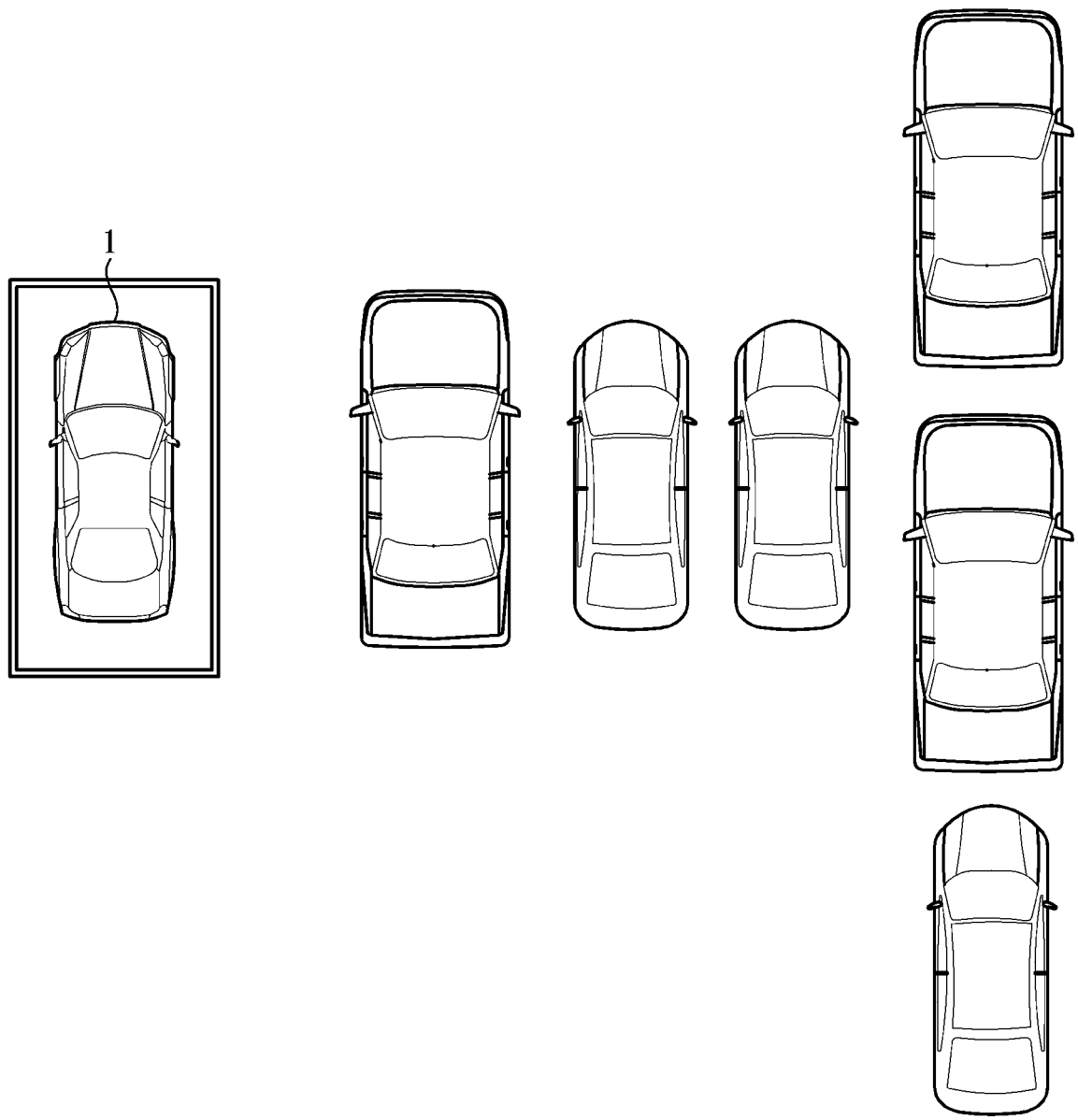
FIGS. 5A, 5B, 5C, 5D, and 5E are views illustrating an example of determining a user's riding environment of a vehicle according to an exemplary embodiment of the disclosure.

As shown in FIG. 5A, the vehicle may be configured to determine whether the current location of the vehicle is a regular parking lot or a road based on the current location information of the vehicle and the map information. Herein, the map information may be digital map information.

The vehicle may be configured to receive detailed map information on the current location from the server and obtain surrounding environment information based on the received detailed map information.

The vehicle may be configured to obtain the surrounding environment information based on the image information obtained by the image obtainer and the obstacle information detected by the obstacle detector, and obtain the location information of the user.

The vehicle may be configured to determine the user's riding environments based on the surrounding environment information and the location information of the user.

In response to that the current location of the vehicle is the regular parking lot, the vehicle may be configured to obtain environment information inside the parking lot, and in response to that the current location of the vehicle is a road, the vehicle may be configured to obtain environment information of the road.

The environment information inside the parking lot may include location information of a parking area, location information of other parked vehicles, existence of a stopper, location information of the stopper, and location information of a changeable lane.

The environment information of the road may include existence of the bus stop and location information of the bus stop, a structure of the road, existence of a traffic light, a lighting color of the traffic light, existence of a crosswalk, and location information of the crosswalk.

The vehicle may be configured to transmit a terminal searching signal and may be configured to transmit a low-frequency searching signal for recognizing the remote controller.

In response to that the response signal transmitted from the terminal 3 is received, the vehicle may be configured to obtain the distance information with the terminal 3 based on the received response signal, and determine whether the user approaches based on the distance information with the terminal 3. In this case, the vehicle may be configured to identify the received signal strength in the received response signal and obtain the distance information with the terminal based on the identified received signal strength.

The vehicle may be configured to obtain the distance information with the terminal based on the location information of the terminal and the current location information of the vehicle, and determine whether the user approaches based on the obtained distance information.

The vehicle may be configured to determine that the remote controller 2 approaches in response to the reception of the high-frequency response signal after transmitting the low-frequency searching signal.

Figure 5B:
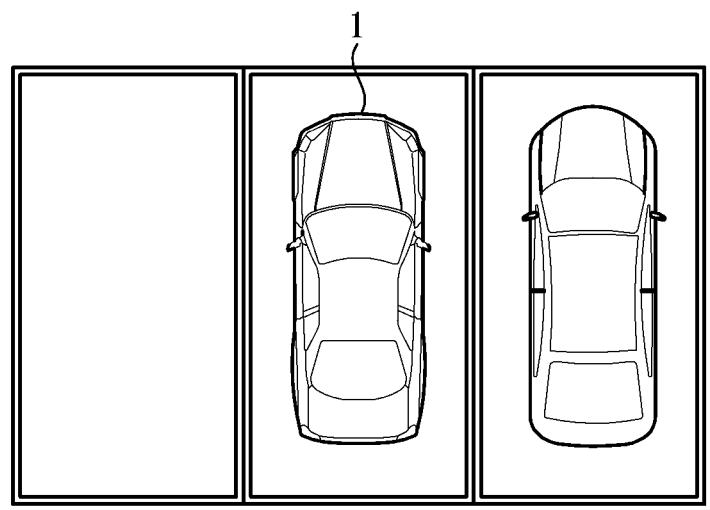
Figure 5B:
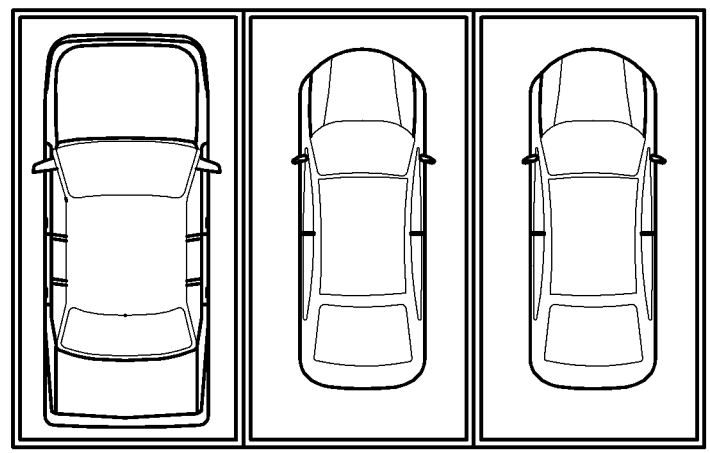

As shown in FIG. 5B, the vehicle may be configured to obtain information on the surrounding environment of the parking lot in response to that the current location of the vehicle is the regular parking lot.

Figure 5C:
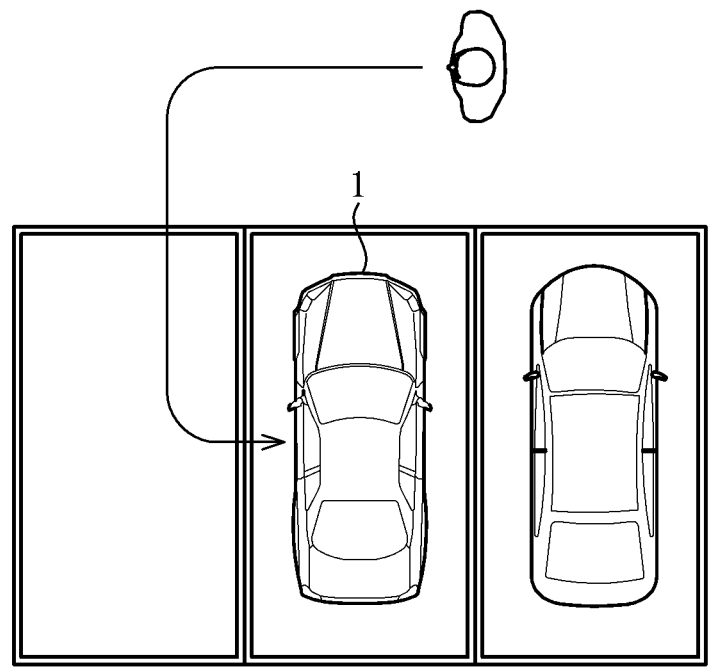
Figure 5C:
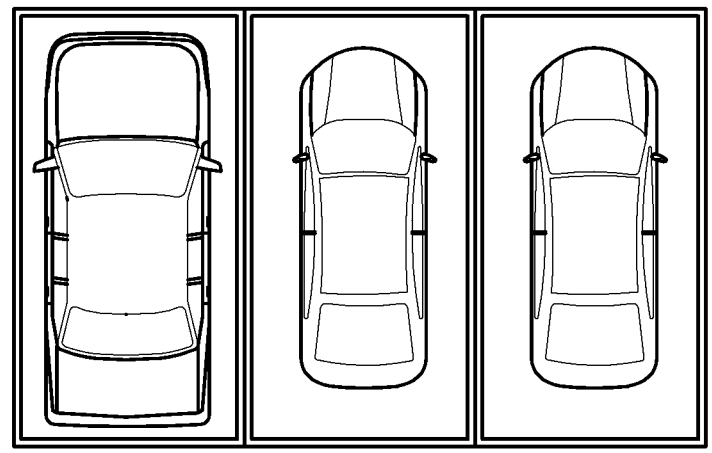

As shown in FIG. 5C, the vehicle obtains the user's location information in the parking lot, and generates user's moving route information based on the vehicle's parking location information and the user's location information in the parking lot.

The vehicle's parking location information in the parking lot may be obtained by the current location information of the vehicle and the structure information of the parking lot.

Figure 5D:
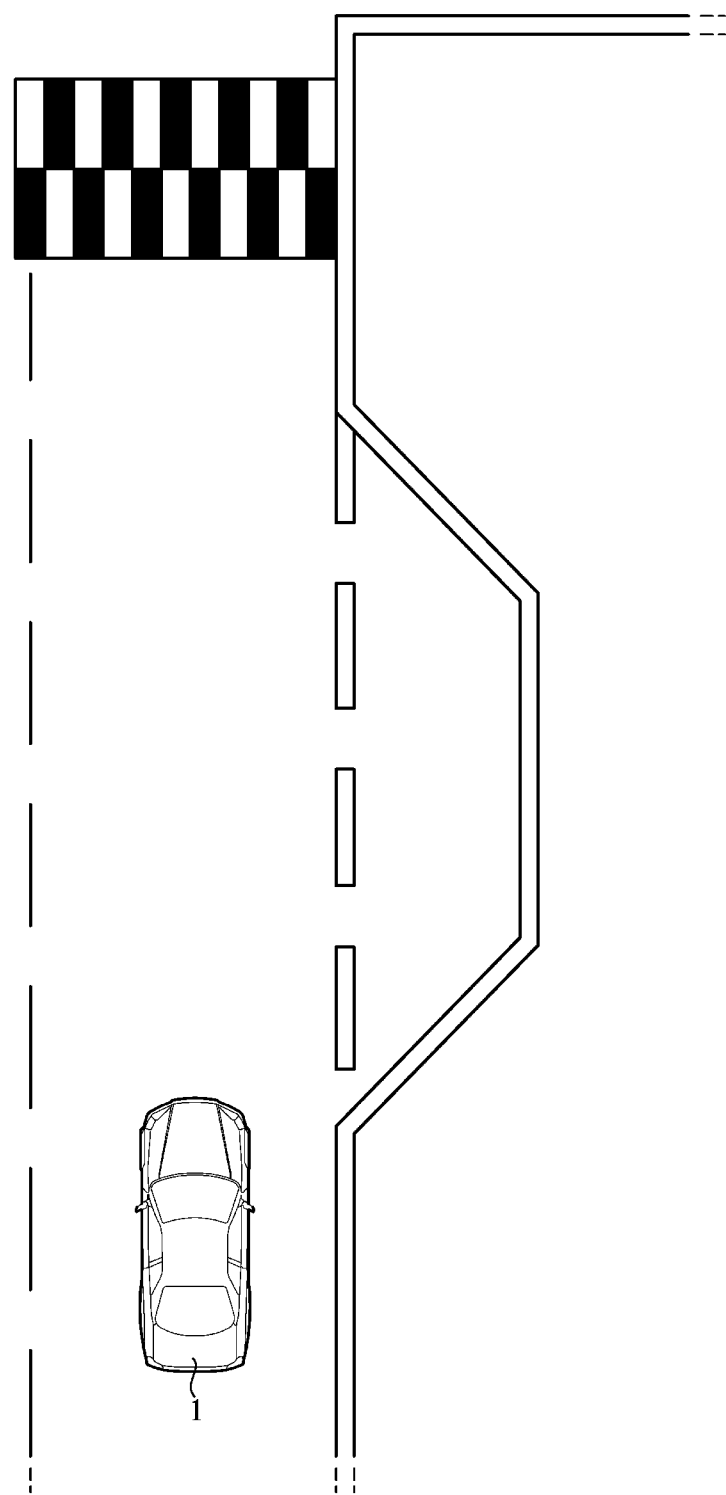

As shown in FIG. 5D, the vehicle may be configured to obtain information on the surrounding environments of the road in response to that the current location of the vehicle is the road.

Figure 5E:
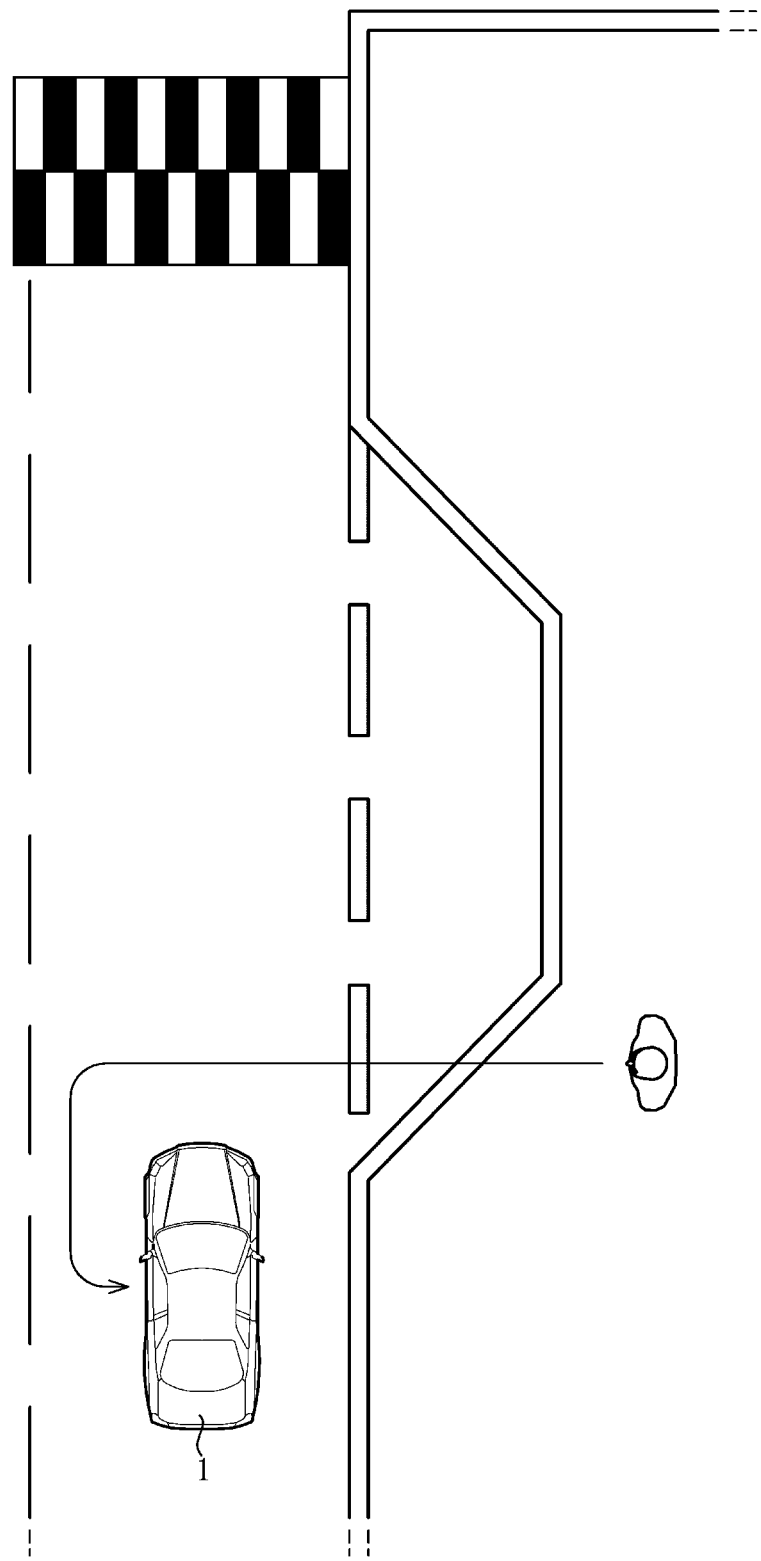

As shown in FIG. 5E, the vehicle obtains the user's location information on the road, and generates the user's moving route information based on the current location information of the vehicle and the user's location information.

Figure 6A:
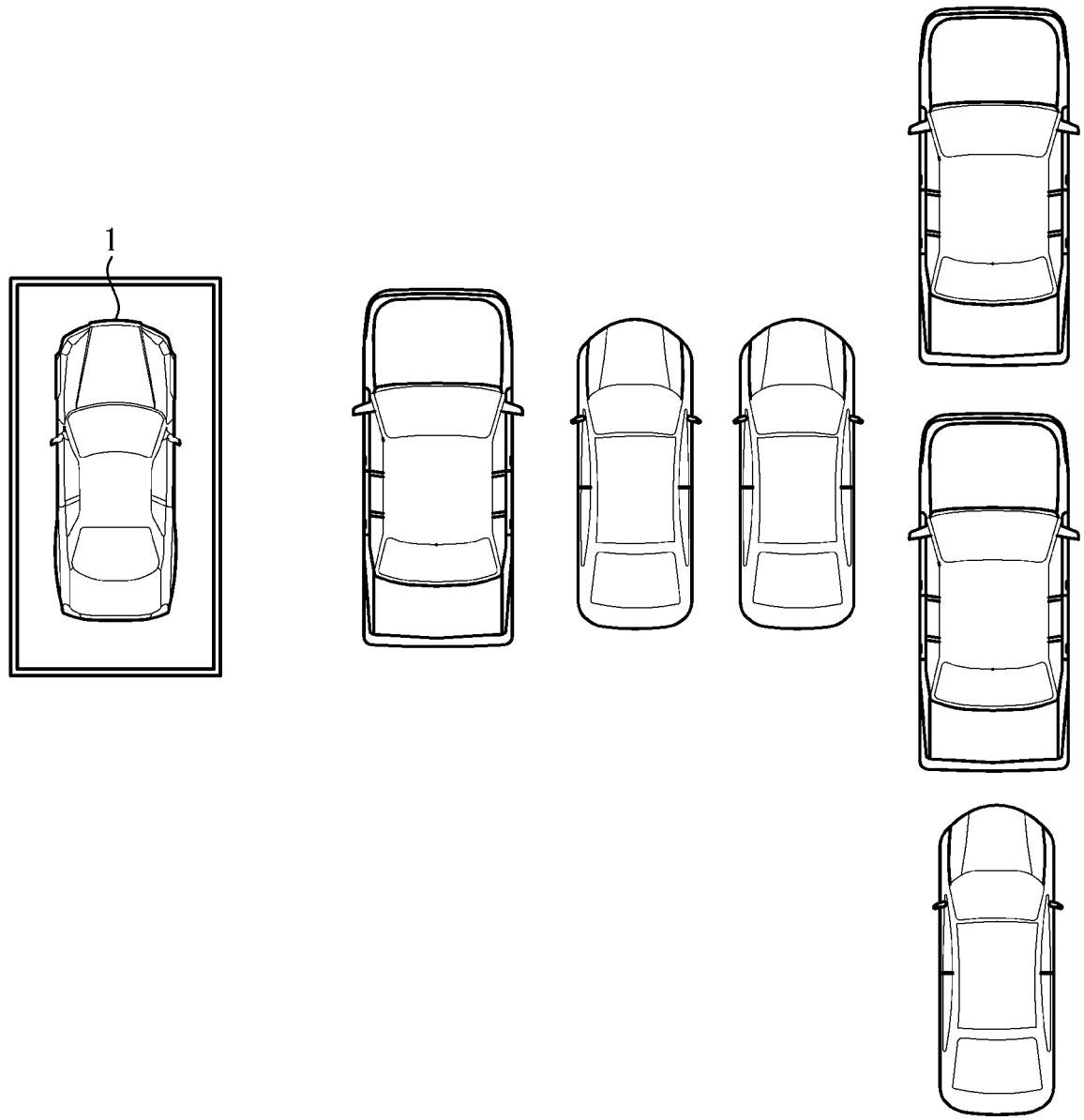
FIGS. 6A, 6B, 6C, 6D, and 6E are views illustrating an example of determining a user's parking environment of a vehicle according to an exemplary embodiment of the disclosure.

As shown in FIG. 6A, the vehicle may be configured to determine a parking environment state (or a stopping environment state) based on the image information obtained by the image obtainer and the obstacle information detected by the obstacle detector.

If autonomous driving and autonomous parking are available, the vehicle may be configured to recognize the safe riding area.

Figure 6B:
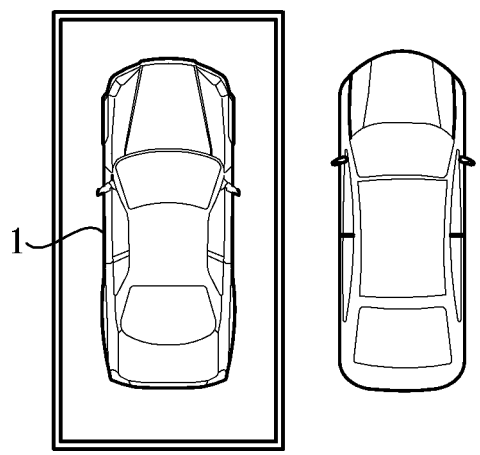

More specifically, as shown in FIG. 6B, in response to that the current location of the vehicle is the regular parking lot, the vehicle may be configured to obtain, based on the image information obtained by the image obtainer, the location information of the parking line, the existence of a stopper and the location information of the stopper, and determine the parking environment state based on the location information of the parking line, the existence of the stopper and the location information of the stopper, which are obtained.

Figure 6C:
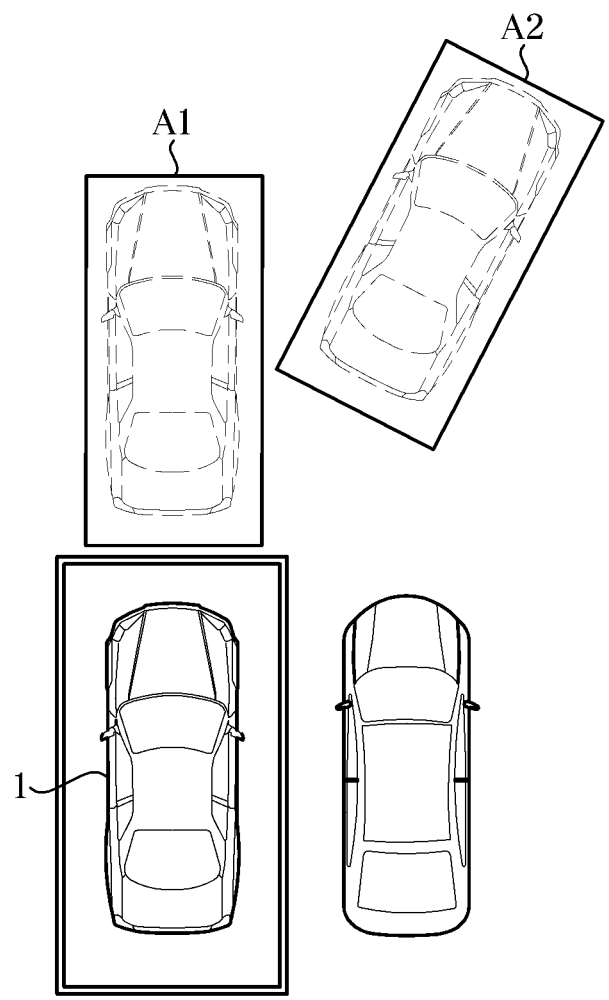

As shown in FIG. 6C, the vehicle may be configured to recognize the safe riding areas A1 and A2 based on the image information obtained by the image obtainer. Herein, the safe riding areas are an area in which the user may safely ride, and may be an area in which a vehicle may move and park.

Figure 6D:
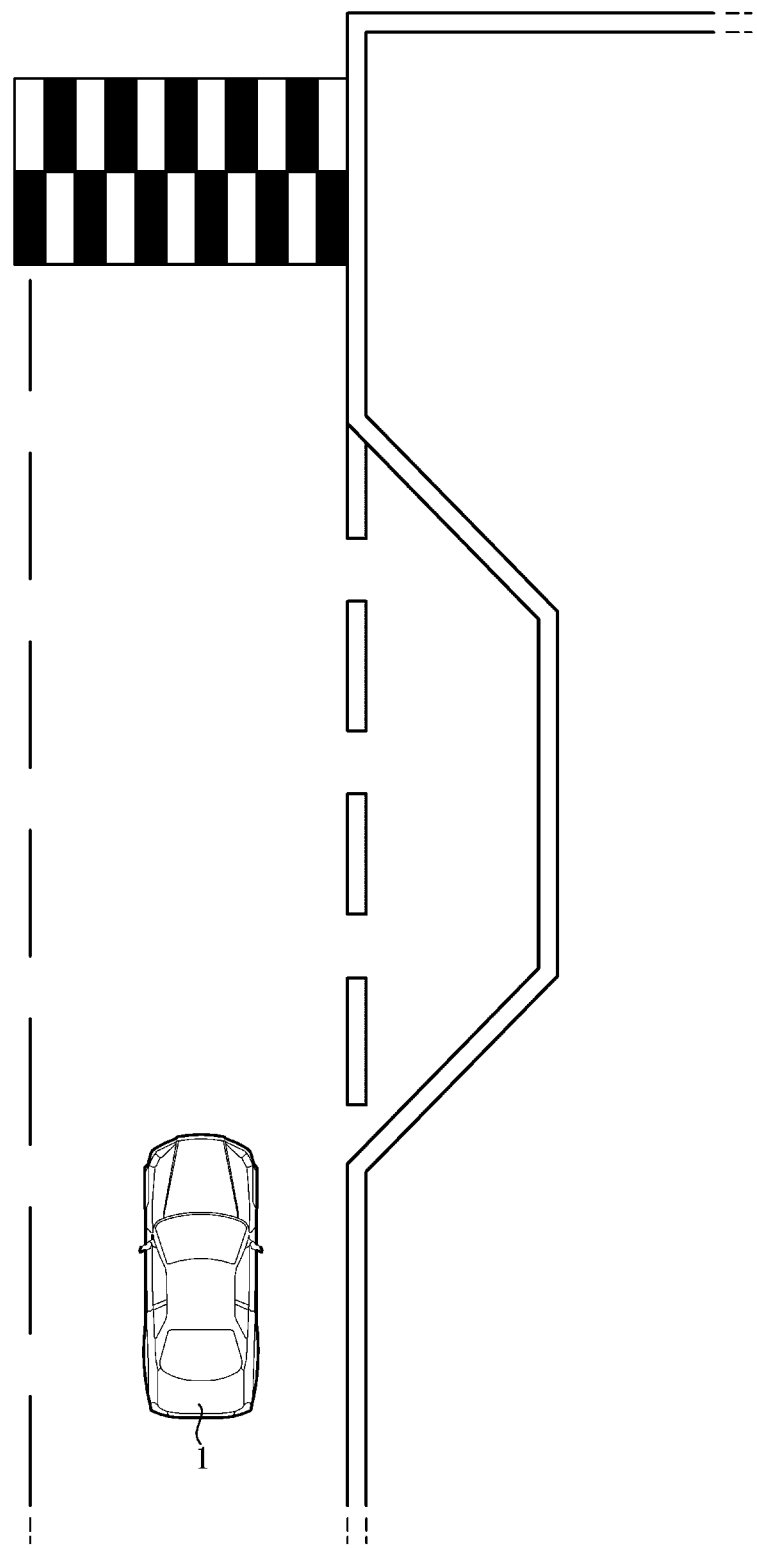

As shown in FIG. 6D, in response to that the current location of the vehicle is a road, the vehicle may be configured to obtain, based on the image information obtained by the image obtainer, the existence of a traffic light, the lighting color information of the traffic light, the existence of a crosswalk, the location information of the crosswalk, the existence of a bus stop, the location information of the bus stop and the structure information of a road, and determine the parking environment state based on the existence of the traffic light, the lighting color information of the traffic light, the existence of the crosswalk, the location information of the crosswalk, the existence of the bus stop, the location information of the bus stop and the structure information of the road, which are obtained.

The existence of the crosswalk, the location information of the crosswalk, the existence of the bus stop, the location information of the bus stop and structure information of the road may also be obtained from navigation information.

Figure 6E:
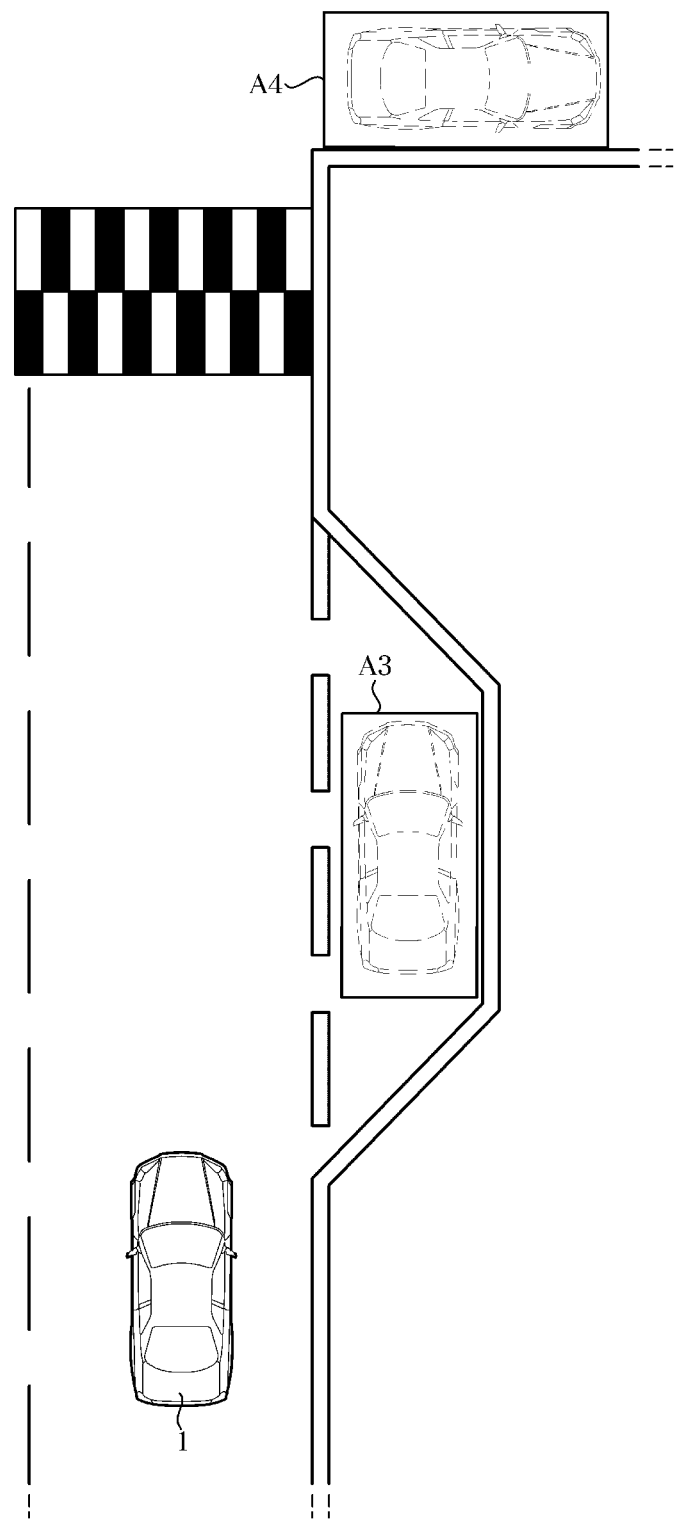

As shown in FIG. 6E, the vehicle may be configured to recognize the safe riding areas A3 and A4 based on the image information obtained by the image obtainer.

The vehicle may be configured to obtain the location information of other vehicles based on the obstacle information detected by the obstacle detector, and determine whether other vehicles approach based on the current location information of other vehicles and the location information of other vehicles.

The vehicle may be configured to also receive the location information of other vehicles from the server or other vehicles.

Figure 7A:
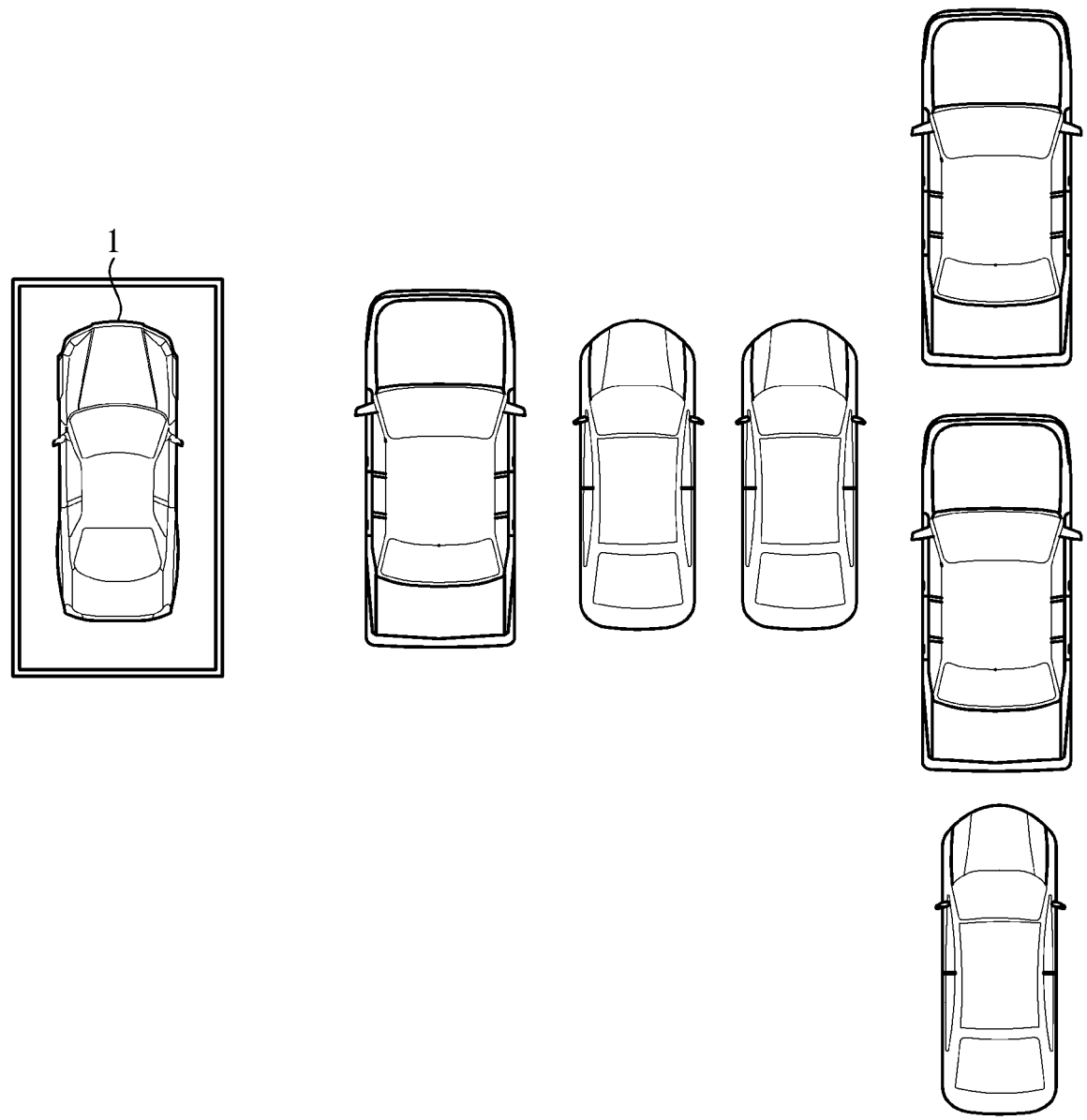
FIGS. 7A, 7B, 7C, 7D, and 7E are views illustrating an example of obtaining location information of other vehicles approaching a vehicle according to an exemplary embodiment of the disclosure.

As shown in FIG. 7A, the vehicle determines whether the current location of the vehicle is a regular parking lot or a road based on the current location information, the map information and the image information. In response to determining that the current location is the regular parking lot, the vehicle may be configured to determine whether other vehicles are approaching based on the obstacle information obtained by the obstacle detector and the image information of the image obtainer.

In response to determining that other vehicles are approaching, the vehicle generates driving route information of the other vehicles based on the obstacle information detected by the obstacle detector, the image information obtained by the image obtainer and the map information.

Figure 7B:
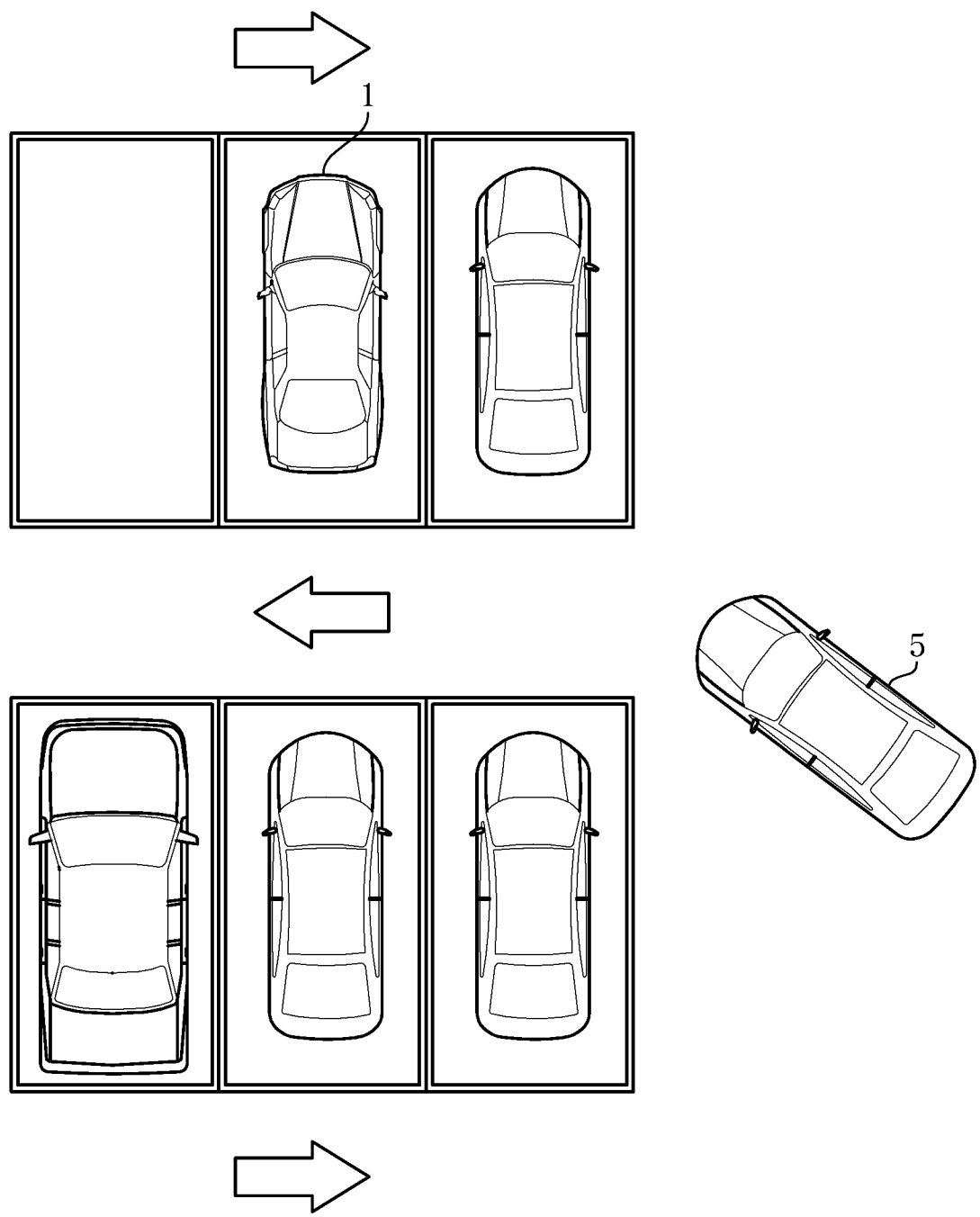

As shown in FIG. 7B, in response to that the current location of the vehicle is a parking lot, the vehicle may be configured to obtain structure information of the parking lot, the location information of the parking line, the location information of the parked vehicles, location information of an empty parking area, and obtain location information of a moving vehicle 5 detected by the obstacle detector.

Figure 7C:
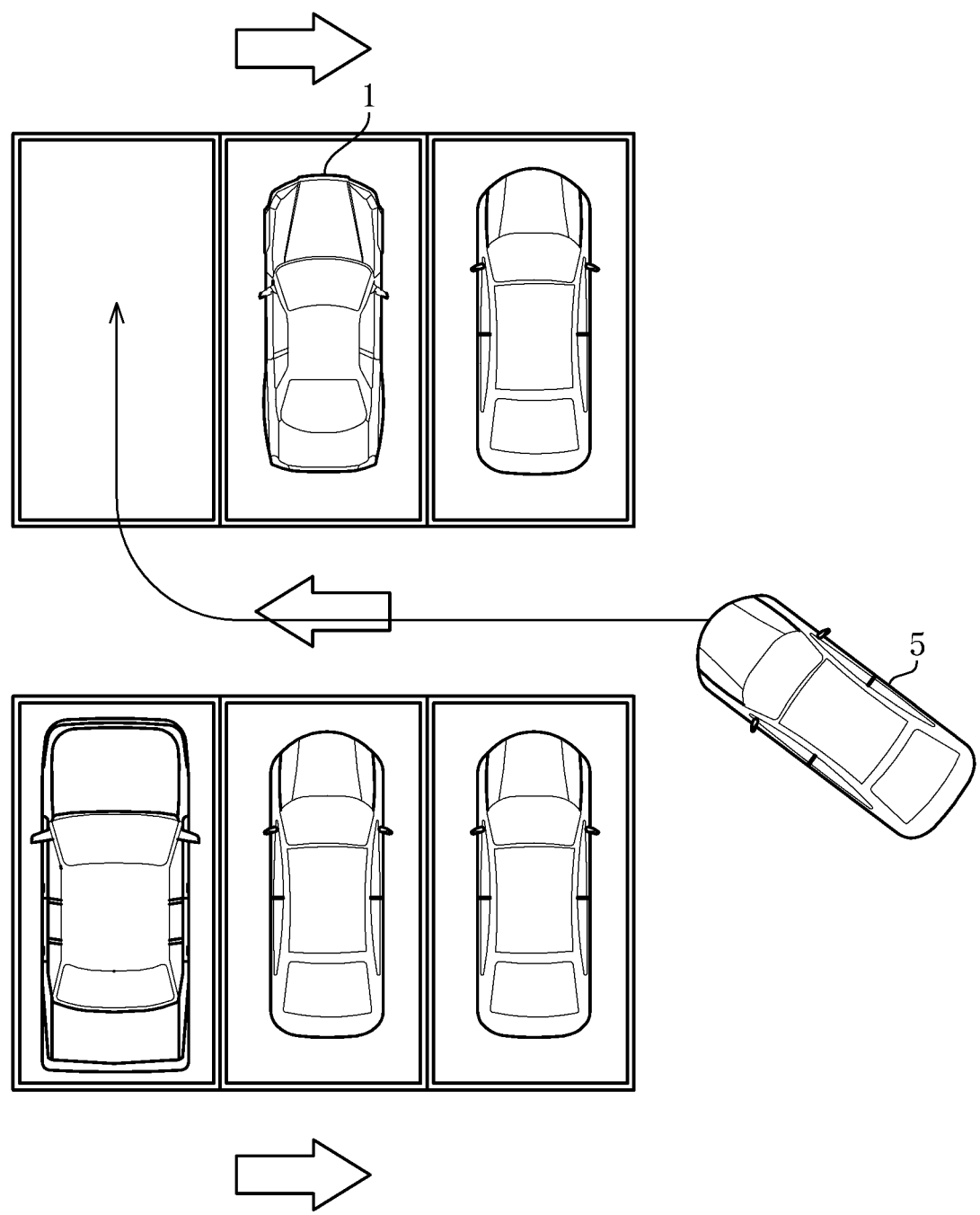

As shown in FIG. 7C, the vehicle may be configured to generate driving route information of the moving vehicle based on the structure information of the parking lot, the location information of the parking line, the location information of the empty parking area, the location information of the parked vehicle and the location information of the moving vehicle 5.

Figure 7D:
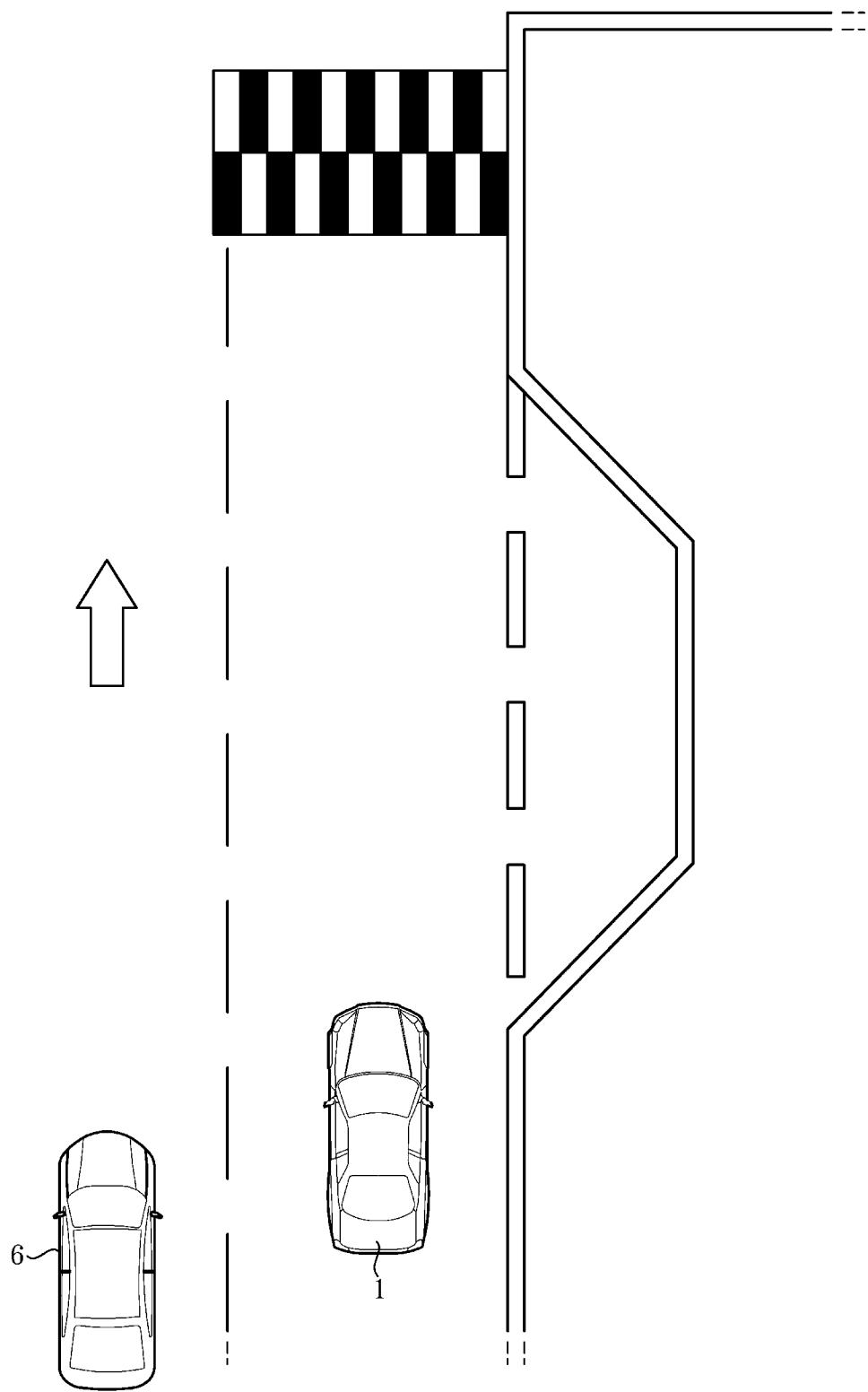

As shown in FIG. 7D, in response to that the current location of the vehicle is a road, the vehicle may be configured to obtain the existence of the bus stop, the location information of the bus stop, the structure information of the road, the existence of the traffic light, the lighting color information of traffic light, the existence of the crosswalk and the location information of the crosswalk based on the image information, the map information and the navigation information, and obtain location information of the driving vehicle 6 detected by the obstacle detector.

Figure 7E:
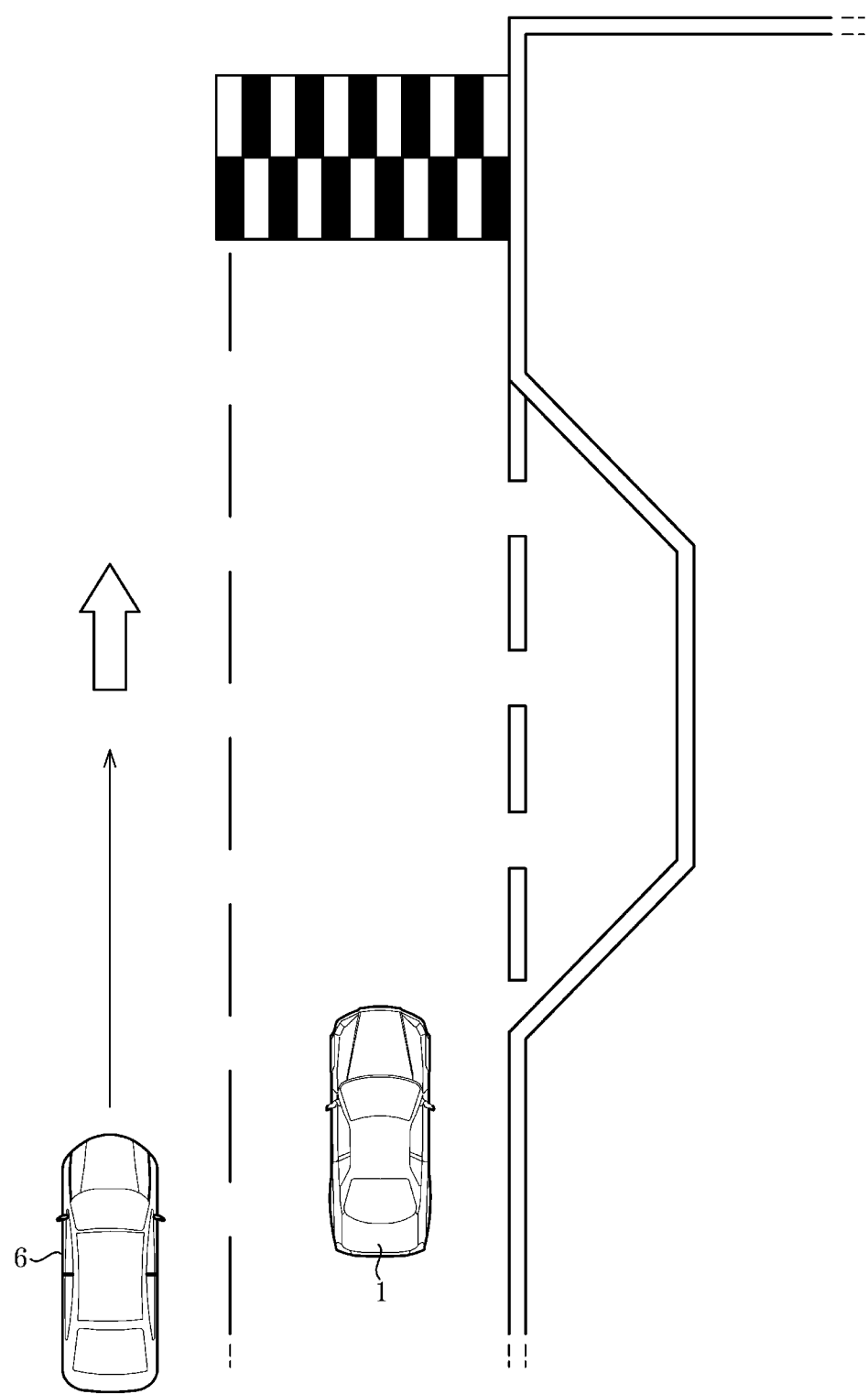

As shown in FIG. 7E, the vehicle may be configured to generate driving route information of the driving vehicle based on the existence of the bus stop, the location information of the bus stop, the structure information of the road, the existence of the traffic light, the lighting color information of traffic light, the existence of the crosswalk, the location information of the crosswalk and the location information of the driving vehicle 6.

The vehicle may be configured to determine the possibility of collision with other vehicles based on the user's riding environment, the parking environment state of the vehicle, and the location information of the other vehicles (in operation 203).

The vehicle may be configured to determine the possibility of collision based on the user's moving route information and the driving route information of other vehicles. Furthermore, the vehicle may be configured to determine a collision location where collision possibility exists based on the user's moving route information and the driving route information of other vehicles.

This will be described with reference to FIGS. 8A, 8B, 8C, 8D, 8E and 8F.

Figure 8A:
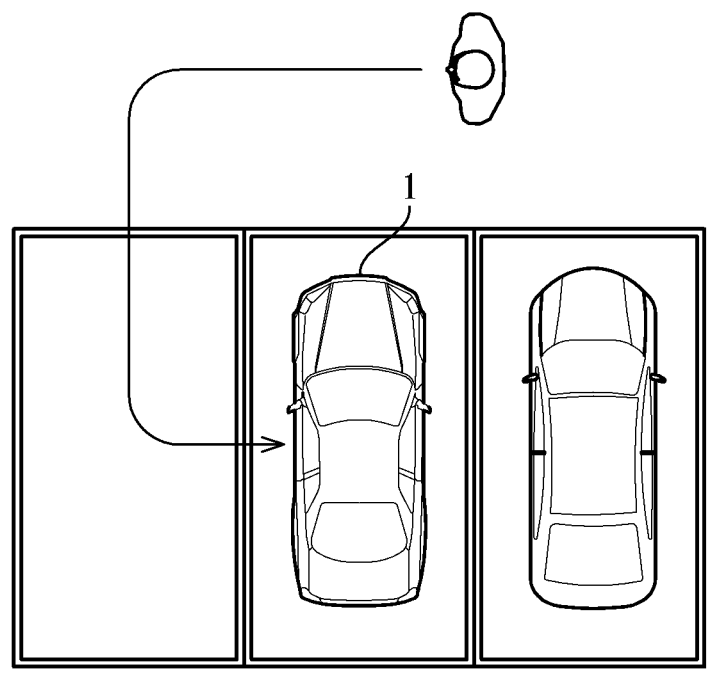
FIGS. 8A, 8B, 8C, 8D, 8E, and 8F are views illustrating an example of determining a possibility of collision between a vehicle and other vehicles according to an exemplary embodiment of the disclosure.
Figure 8A:
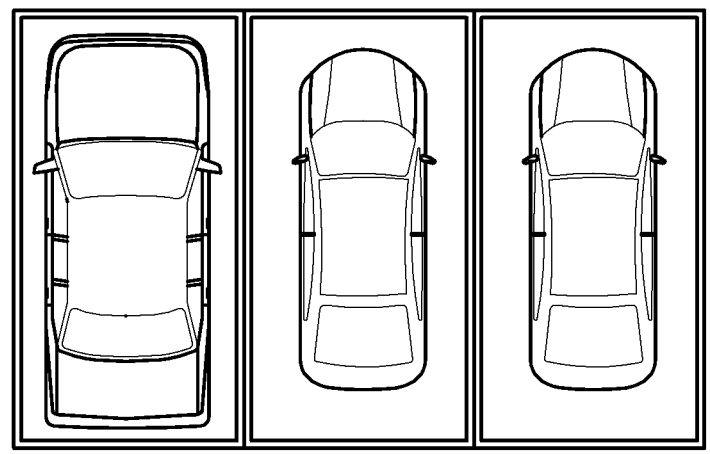
Figure 8B:
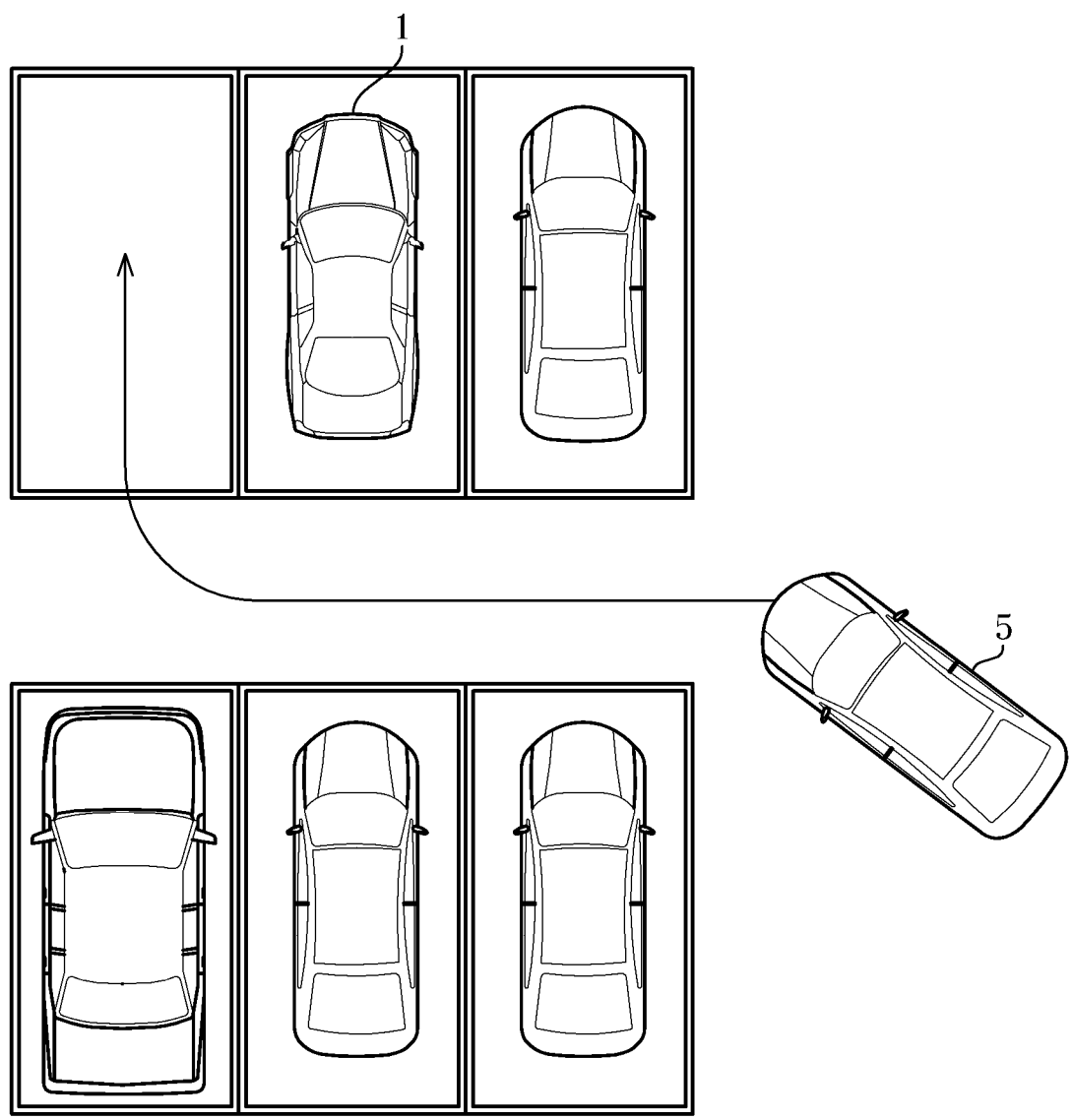
Figure 8C:
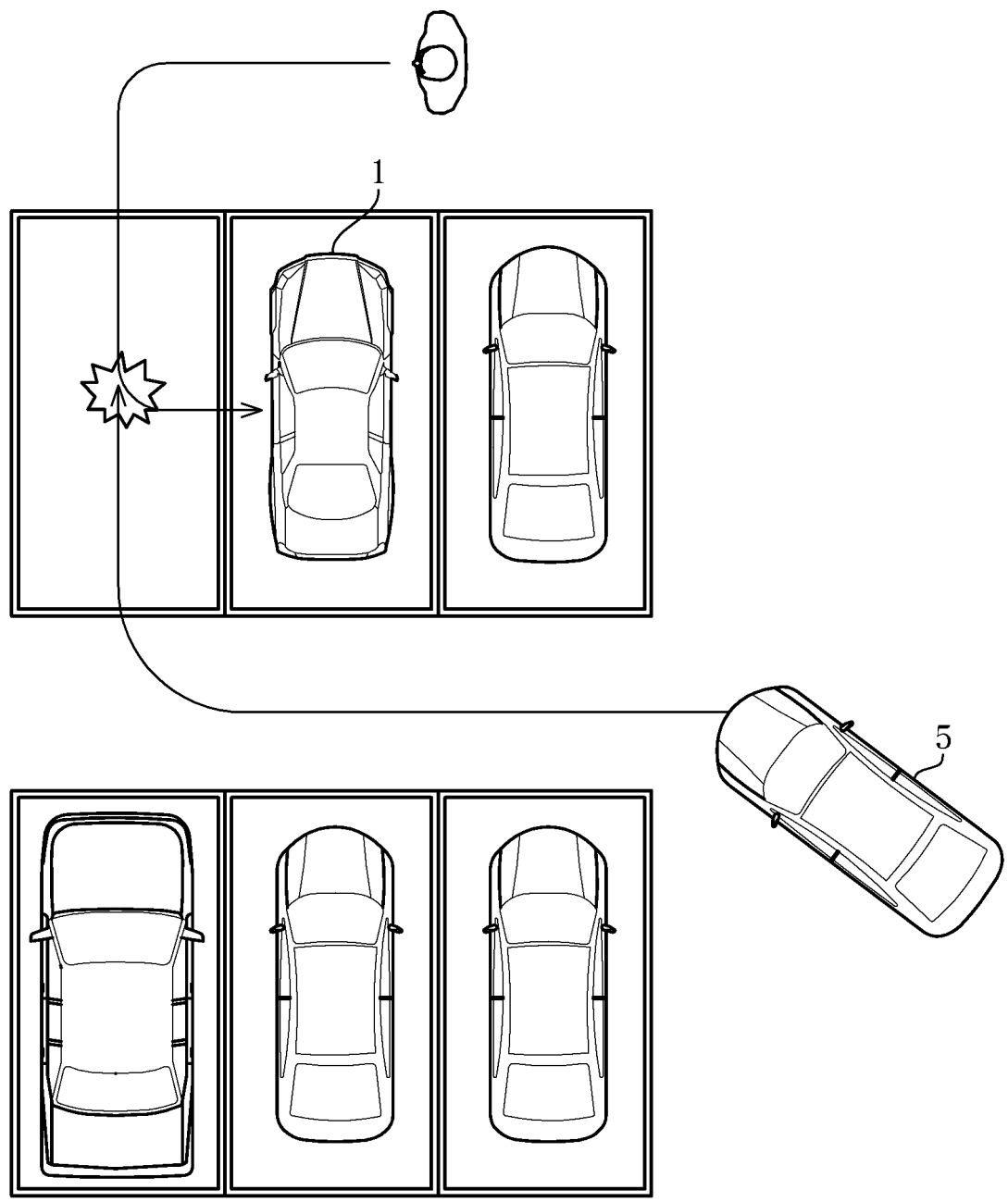

In response to that the current location of the vehicle is a parking lot, the vehicle may be configured to obtain the moving route information of the user shown in FIG. 8A, obtain the driving route information of other vehicles shown in FIG. 8B, and as shown in FIG. 8C, determine the collision possibility and the collision location by comparing the moving route information of the user with the driving route information of other vehicles.

Figure 8D:
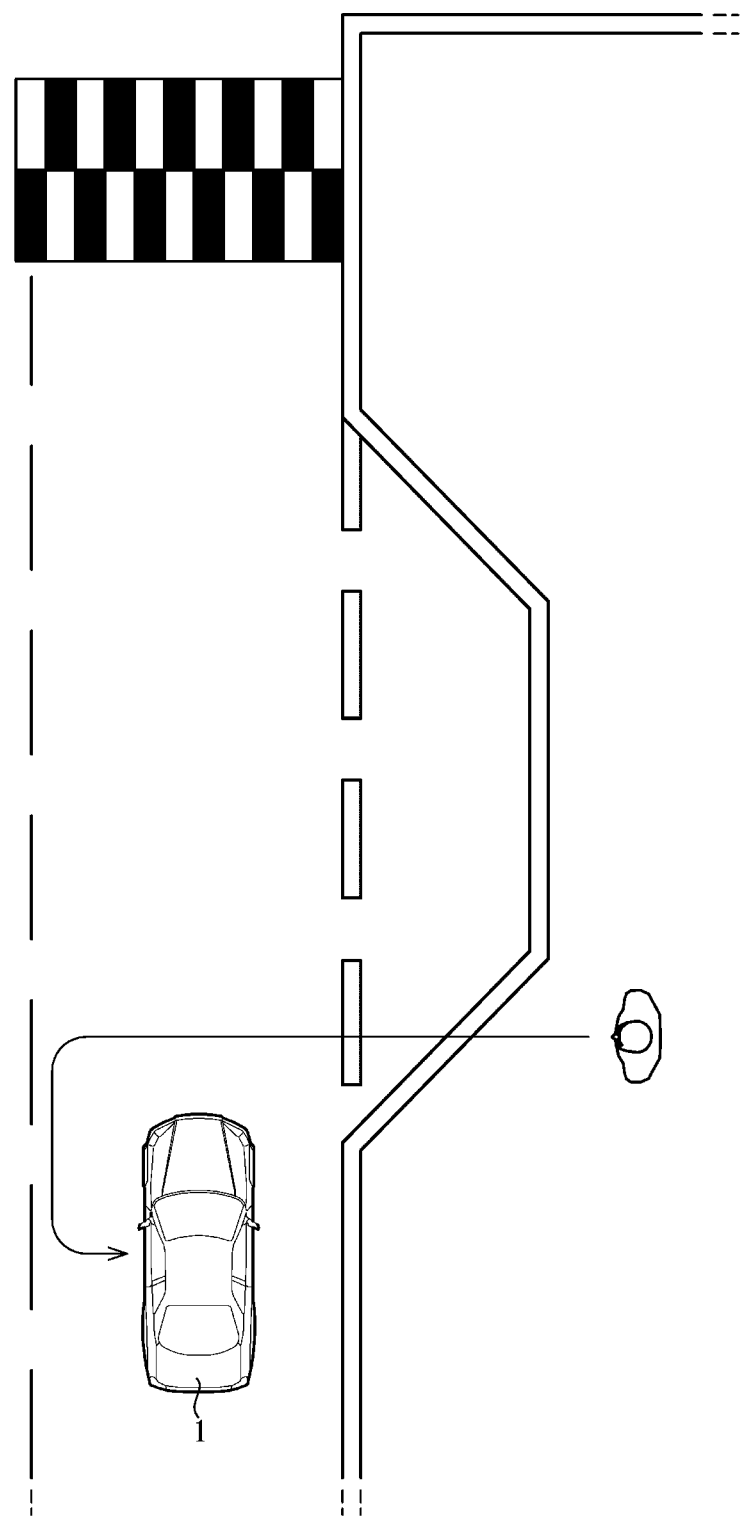
Figure 8E:
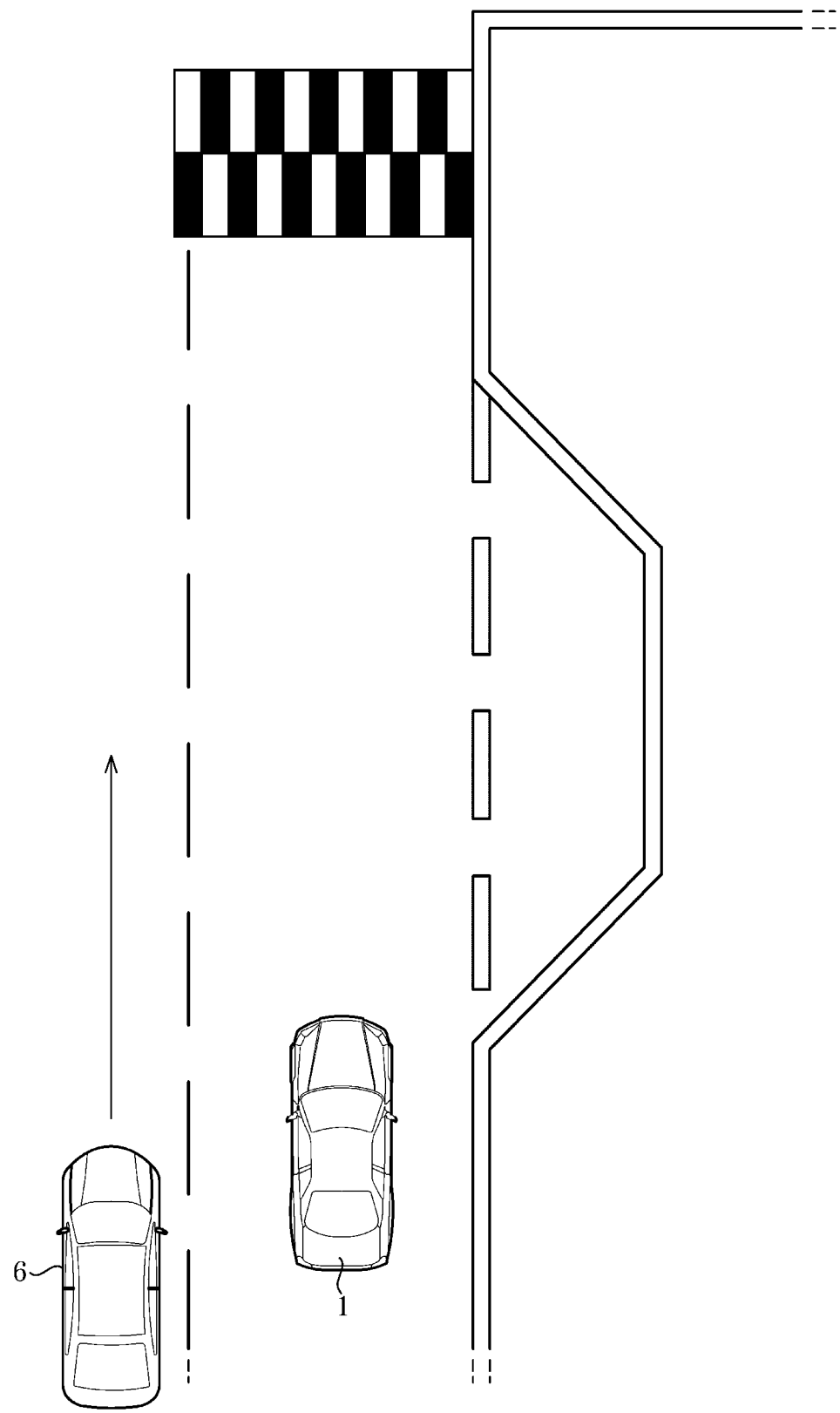
Figure 8F:
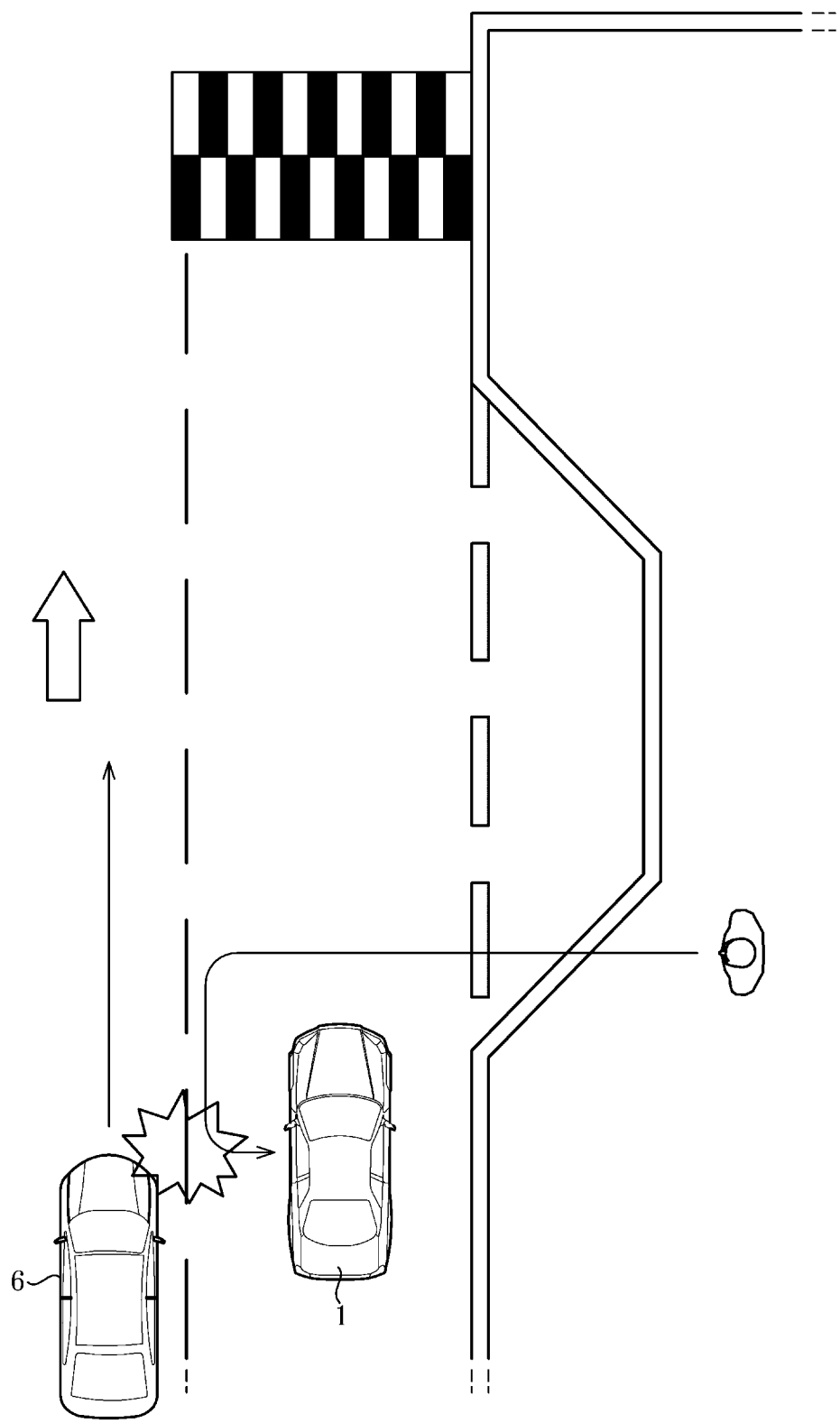

In response to that the current location of the vehicle is a road, the vehicle may be configured to obtain the moving route information of the user shown in FIG. 8D, obtain the driving route information of other vehicles shown in FIG. 8E, and as shown in FIG. 8F, determine the collision possibility and the collision location by comparing the moving route information of the user with the driving route information of other vehicles.

The vehicle determines whether the safe riding area exists (in operation 204), and in response to determining that the safe riding area does not exist, the vehicle outputs notification information for the collision possibility (in operation 205).

In response to determining that the safe riding area exists, the vehicle controls autonomous driving and autonomous parking so that the vehicle may be moved to the safe riding area (in operation 206), and transmit movement information to the safe riding area and the location information to the user terminal so that the user may recognize the movement of the vehicle.

This will be described with reference to FIGS. 9A, 9B, 9C, 9D, 9E, and 9F.

Figure 9A:
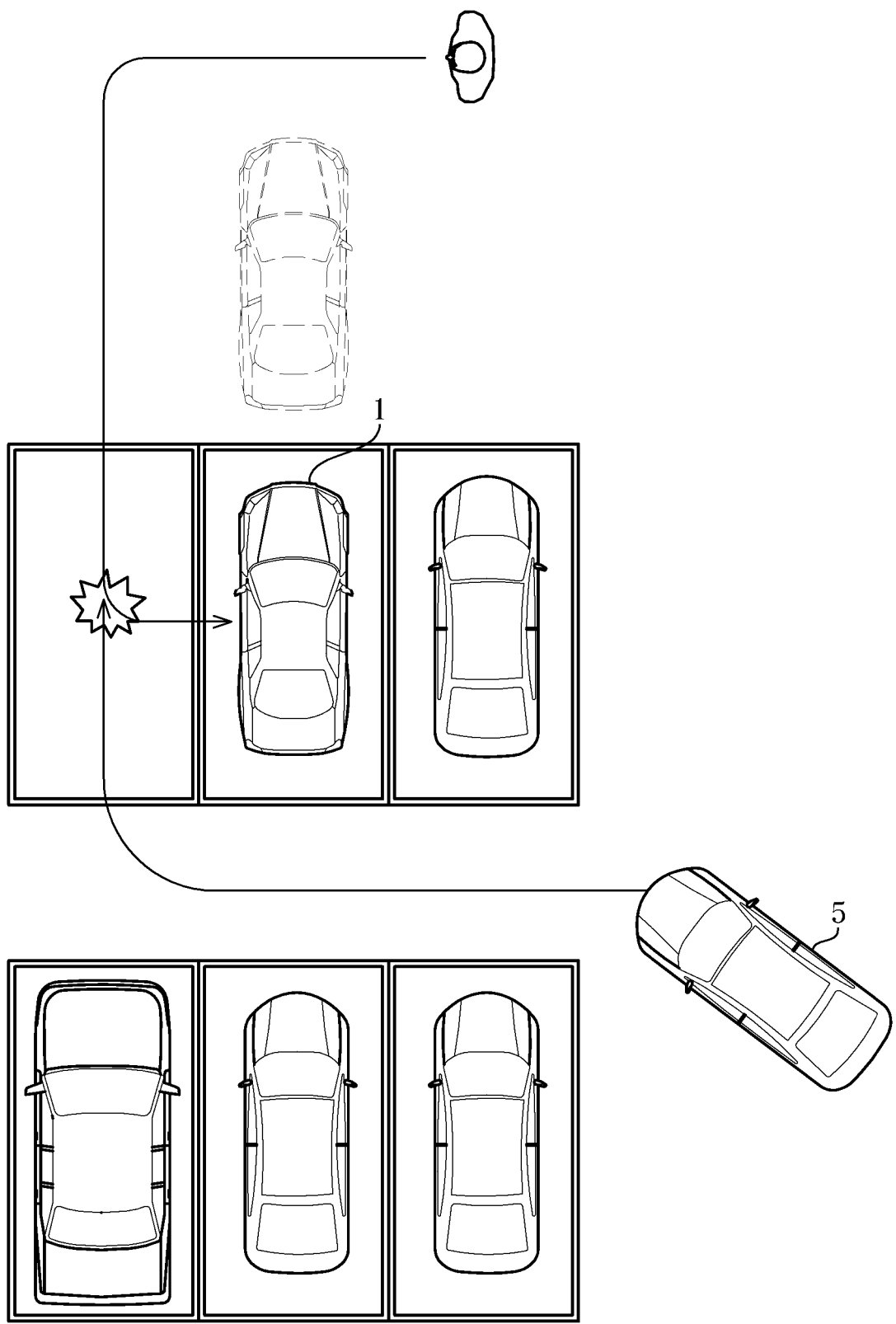
FIGS. 9A, 9B, 9C, 9D, 9E, and 9F are views illustrating an example of outputting notification information on a possibility of collision between a vehicle and other vehicles according to an exemplary embodiment of the disclosure.

As shown in FIG. 9A, when the current location of the vehicle is a parking lot, in response to determining that the collision possibility with other vehicles exists, the vehicle determines whether the safe riding area exists.

Figure 9B:
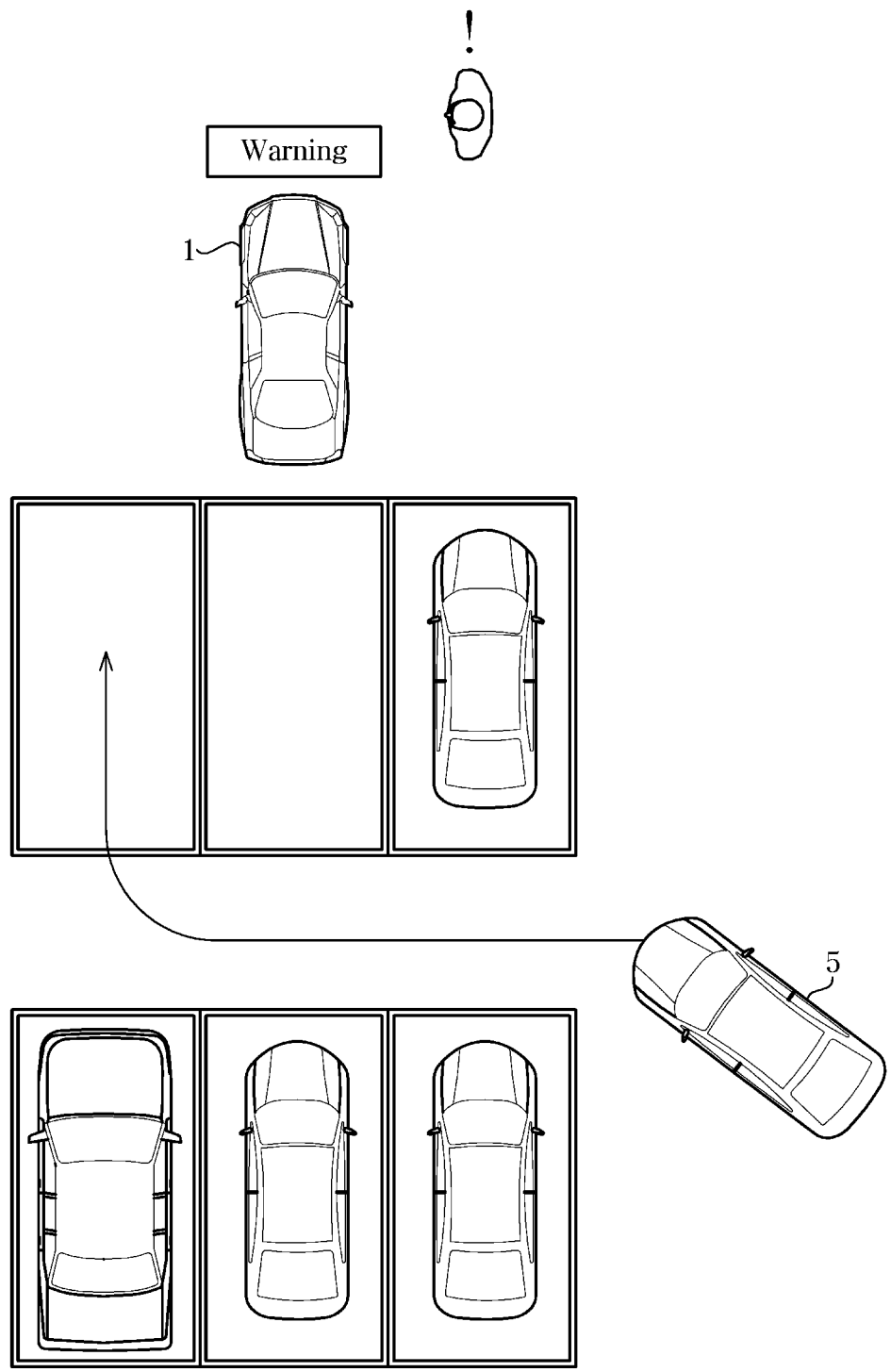

As shown in FIG. 9B, in response to determining that the safe riding area exists, the vehicle controls to be moved to the safe riding area and outputs the notification information for the collision possibility.

Figure 9C:
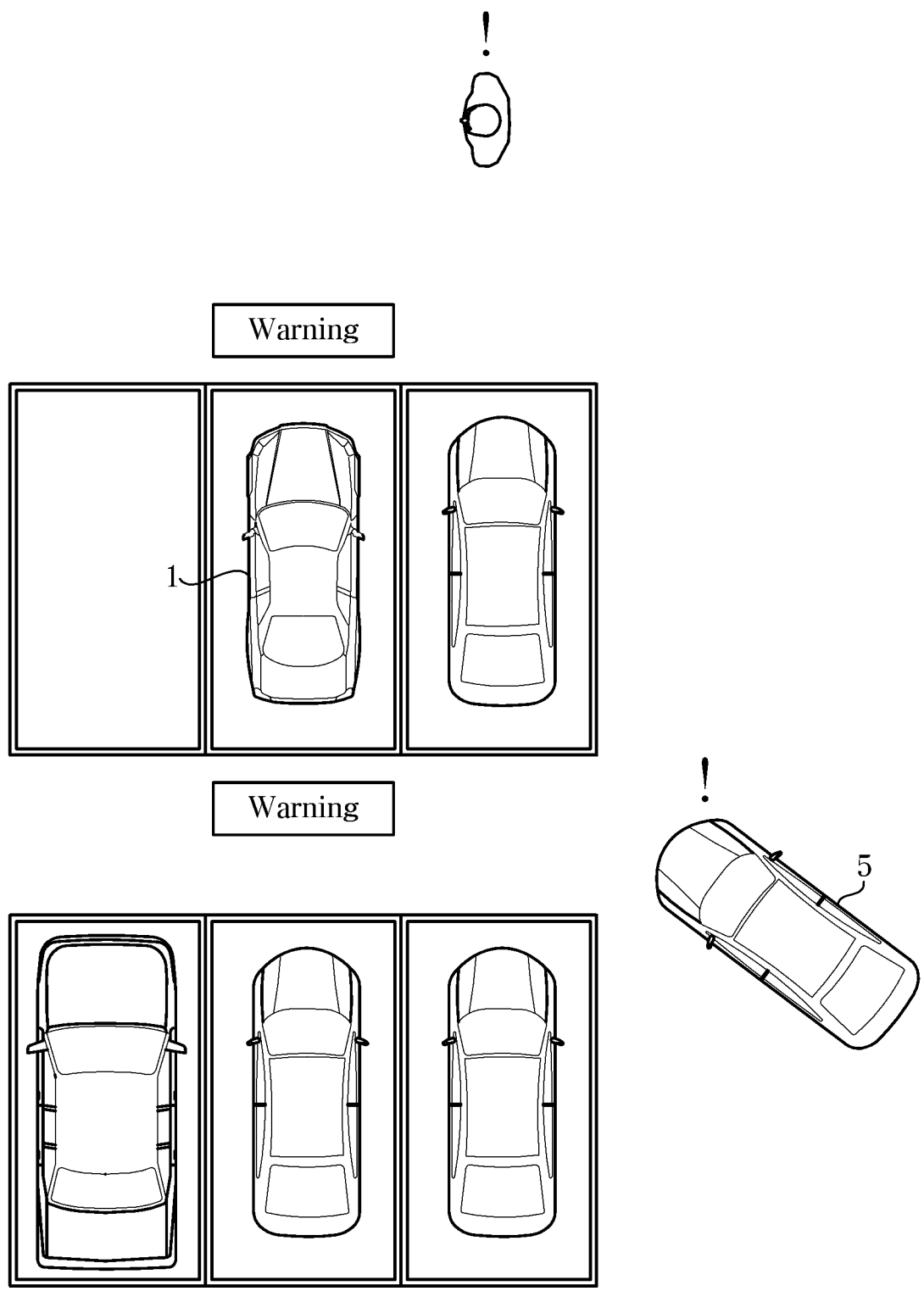

As shown in FIG. 9C, in response to determining that the safe riding area does not exist, the vehicle outputs the notification information for the collision possibility.

Outputting the notification information may include turning on an emergency lamp, turning on a headlamp, or outputting a warning sound through a Clarkson.

Outputting the notification information may include transmitting the movement information of the vehicle, the location information and the notification information for the collision possibility, to the user terminal.

Figure 9D:
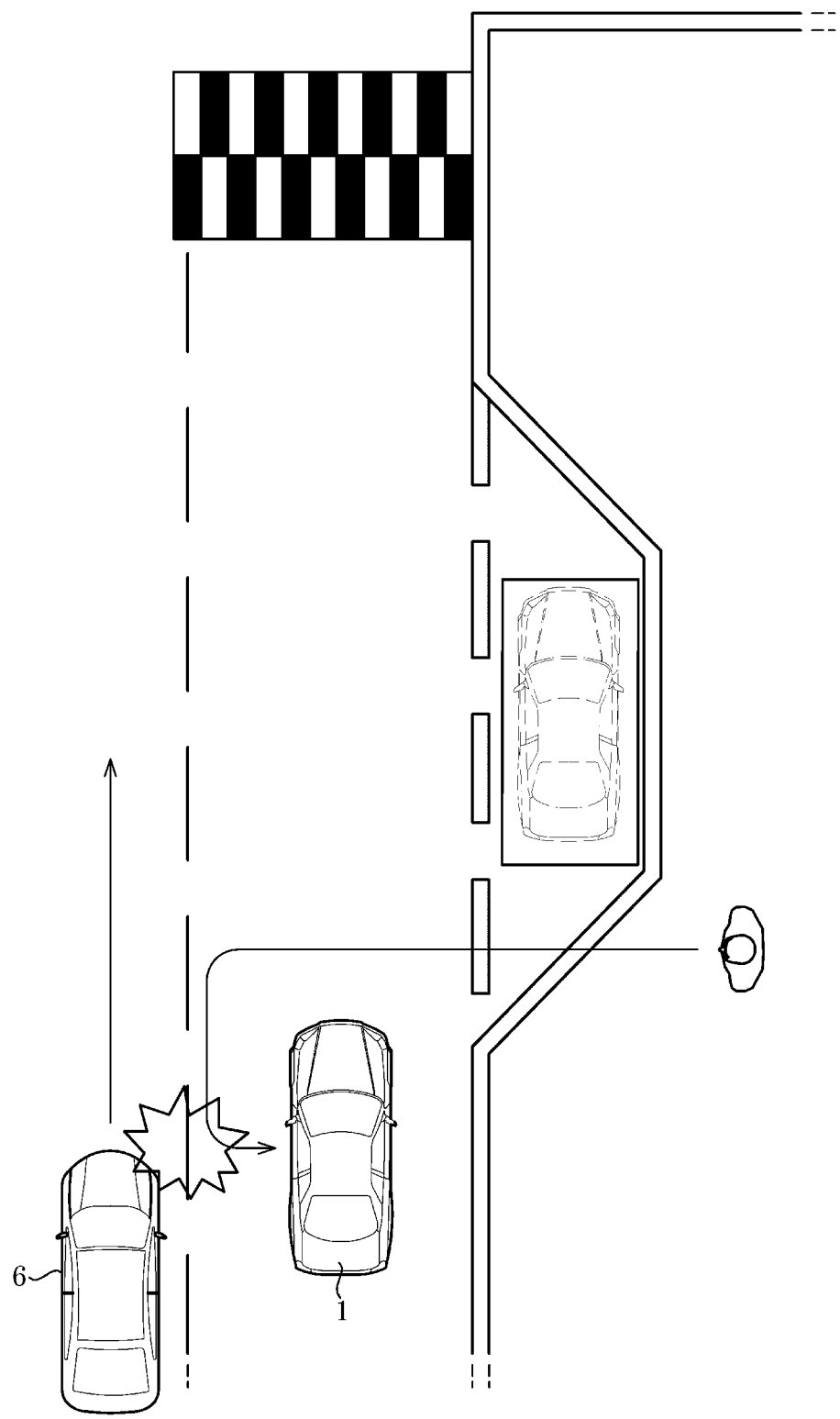

As shown in FIG. 9D, when the current location of the vehicle is on a road, in response to determining that the collision possibility with other vehicles exists, the vehicle determines whether the safe riding area exists.

Figure 9E:
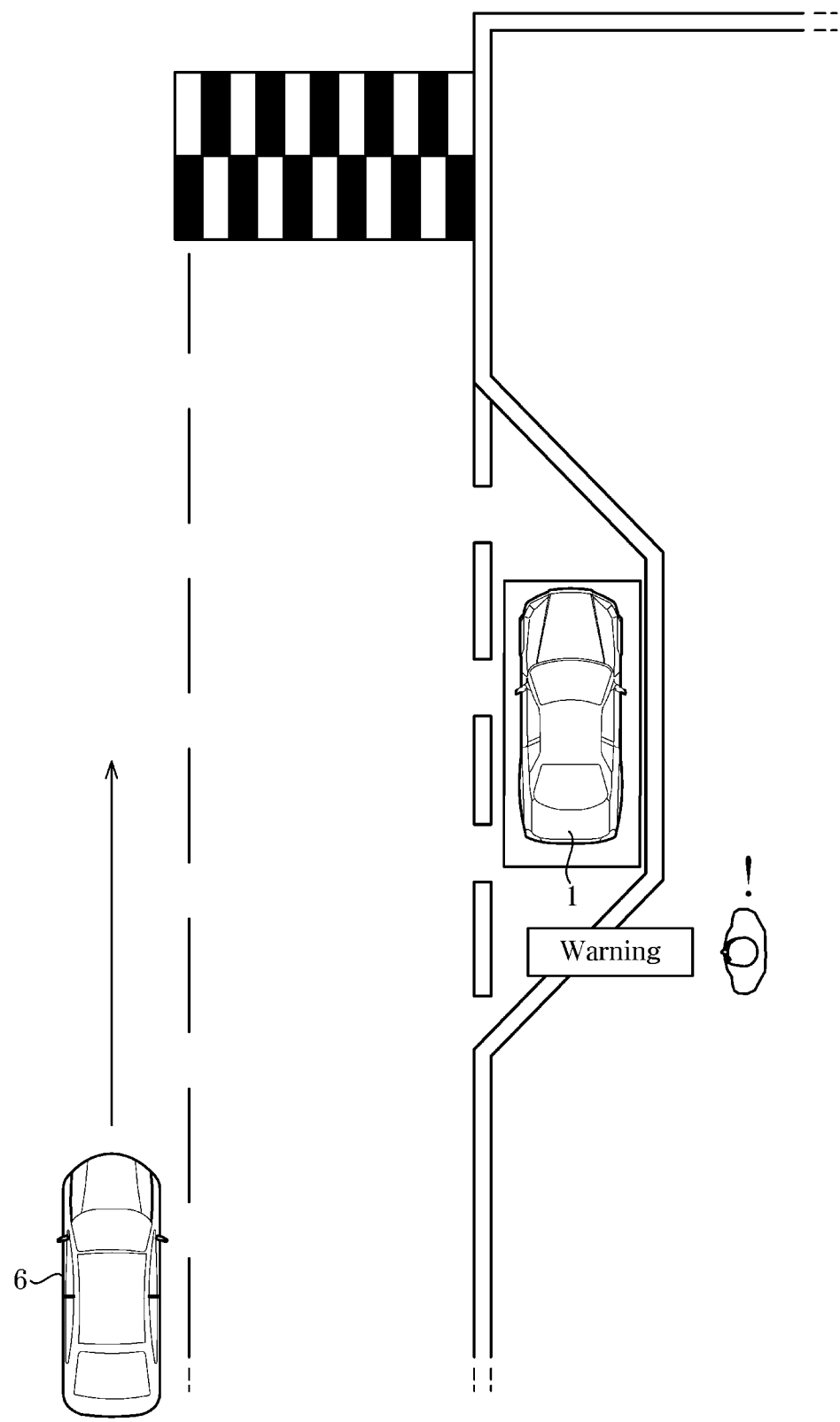

As shown in FIG. 9E, in response to determining that the safe riding area exists, the vehicle controls to be moved to the safe riding area and outputs the notification information for the collision possibility.

Figure 9F:
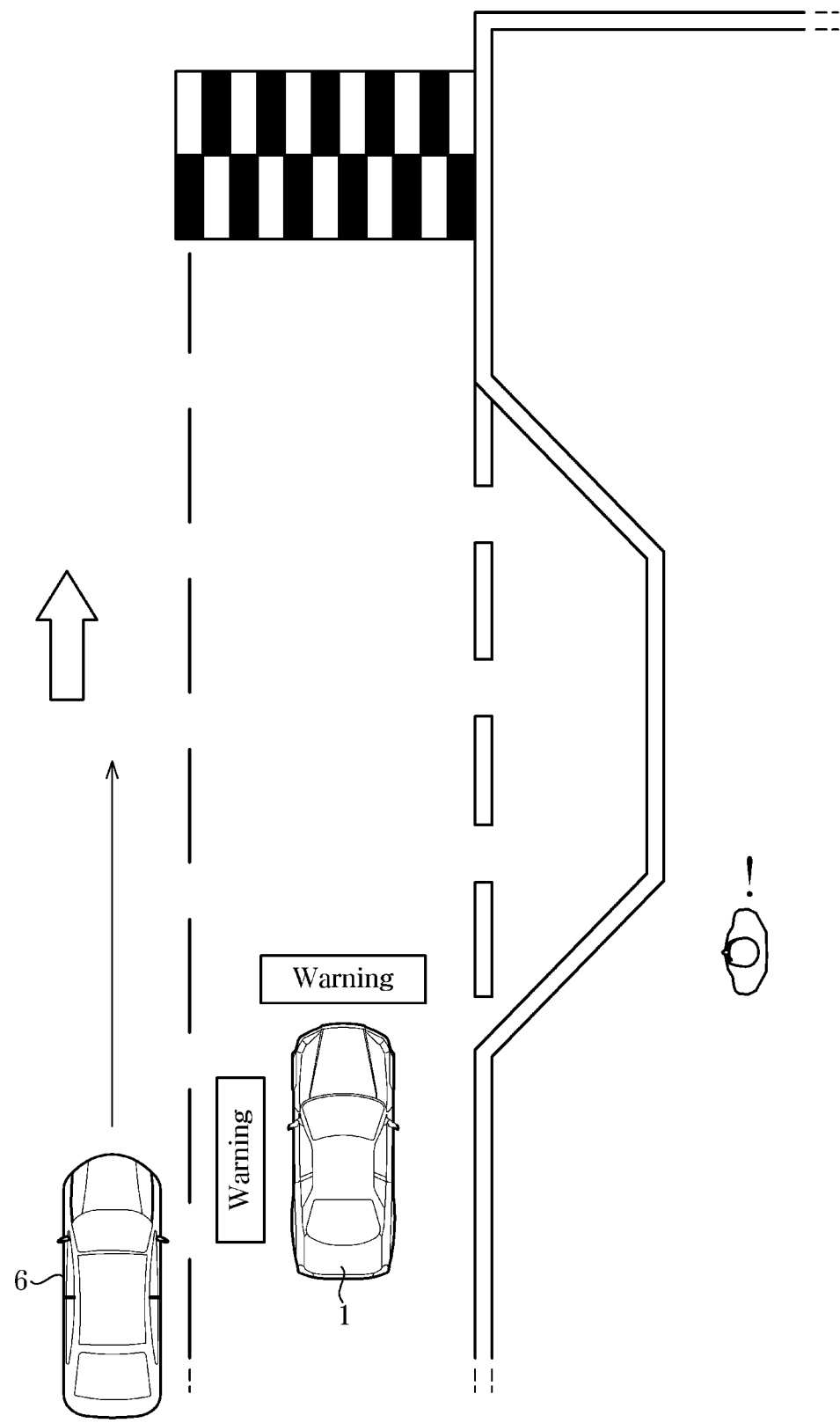

As shown in FIG. 9F, in response to determining that the safe riding area does not exist, the vehicle outputs the notification information for the collision possibility.

Outputting the notification information may include turning on the emergency lamp, turning on the headlamp.

Outputting the notification information may include transmitting the movement information of the vehicle, the location information and the notification information for the collision possibility, to the user terminal.

As is apparent from the above, embodiments of the disclosure may secure the riding safety of the user by determining the collision possibility with obstacles while riding in response to the user's riding intention and outputting the notification information for collision in response to the result of determination.

Further, the embodiments of the disclosure may flexibly cope with collisions with obstacles and improve user convenience by controlling autonomous driving and autonomous parking of the vehicle based on the user's riding intention and surrounding environments, thereby reducing occurrence of traffic accidents.

Further, the embodiments of the disclosure may output the notification information for the collision possibility with other vehicles in response to the user's riding state without adding a hardware configuration, thereby preventing an increase in manufacturing costs of the vehicle and improving the stability of the vehicle.

As described above, the embodiments of the disclosure may improve the quality and marketability of the advanced driver assistance system and the vehicle having the advanced driver assistance system, further increase user satisfaction, and secure product competitiveness.

Meanwhile, the exemplary embodiments of the disclosure may be embodied in the form of a recording medium storing instructions executable by a computer. The instructions may be configured to be stored in the form of program code and, when executed by a processor, may be configured to generate a program module to perform the operations of the exemplary embodiments. The recording medium may be embodied as a non-transitory computer-readable recording medium.

The non-transitory computer-readable recording medium may comprise all types of recording media in which instructions which may be decoded by a computer are stored, for example, a Read Only Memory (ROM), a Random Access Memory (RAM), a magnetic tape, a magnetic disk, a flash memory, an optical data storage device, and the like.

Although exemplary embodiments of the disclosure have been described for illustrative purposes, those skilled in the art will appreciate that various modifications, additions and substitutions are possible, without departing from the scope and spirit of the disclosure. Therefore, exemplary embodiments of the present disclosure have not been described for limiting purposes.

What is claimed is:

1. A driver assistance system to prevent collision, comprising:
   a communicator configured to communicate with an obstacle detector that is configured to detect an obstacle; and
   a processor configured to:
      determine a riding intention of a user in response to reception of a door unlocking instruction when a vehicle is parked or stopped and a user of the vehicle gets off;
      obtain location information of one or more other vehicles based on obstacle information detected by the obstacle detector in response to determining that the riding intention exists;
      determine a collision possibility with the one or more other vehicles based on the location information of the one or more other vehicles; and
      control an output of notification information for a collision between the user and the one or more other vehicles in response to determining that the collision possibility exists.

2. The driver assistance system of claim 1, wherein the communicator is configured to:
   communicate with at least one of a remote controller and a terminal; and
   receive the door unlocking instruction from the at least one of the remote controller and the terminal.

3. The driver assistance system of claim 1, wherein:
   the communicator is configured to:
      receive current location information; and
      perform communication with an image obtainer that obtains a surrounding image, and
   the processor is further configured to:
      obtain surrounding environment information based on the received current location information, pre-stored map information, and image information for the surrounding image;
      determine a parking environment state based on the obtained surrounding environment information; and
      determine the collision possibility with other vehicles based on the parking environment state and the location information of the one or more other vehicles.

4. The driver assistance system of claim 3, wherein the processor is further configured to:
   determine whether a current location is a parking lot or a road based on the received current location information and the pre-stored map information;
   obtain the surrounding environment information of the parking lot based on the image information for the surrounding image and the map information in response to determining that the current location is the parking lot; and
   obtain the surrounding environment information of the road based on the image information for the surrounding image and the map information in response to determining that the current location is the road.

5. The driver assistance system of claim 3, wherein:
   the communicator is configured to perform communication with at least one of a remote controller and a terminal, and
   the processor is further configured to:
      obtain user's location information based on at least one of a received signal strength when communicating with the remote controller and a received signal strength when communicating with the terminal;
      obtain moving route information of the user based on the user's location information;
      obtain driving route information of other vehicles based on the location information of the one or more other vehicles; and
      determine the collision possibility with other vehicles based on the moving route information of the user and the driving route information of other vehicles.

6. The driver assistance system of claim 5, wherein the processor is further configured to transmit the notification information for the collision to the terminal in response to determining that the collision possibility exists.

7. The driver assistance system of claim 3, wherein the processor is further configured to:

in response to determining that the collision possibility with other vehicles exists, recognize a safe riding area based on the received current location information, the pre-stored map information and the image information for the surrounding image; and control autonomous driving and autonomous parking to be moved to the recognized safe riding area.

8. The driver assistance system of claim 1, wherein the communicator is configured to communicate with other vehicles and a server, and receive the location information of the one or more other vehicles from the other vehicles or receive the location information of other vehicles from the server.

9. A vehicle, comprising:
a door;
an obstacle detector configured to detect an obstacle;
an image obtainer configured to obtain a surrounding image;
a communicator configured to perform communication with at least one of a remote controller and a terminal;
a processor configured to:
   obtain location information of other vehicles based on obstacle information detected by the obstacle detector in response to determining that a unlocking instruction of the door is received through the communicator when a vehicle is parked or stopped and a user of the vehicle gets off;
   determine a collision possibility with other vehicles based on the location information of other vehicles and image information for the surrounding image; and
   control output of notification information for a collision between the user and the other vehicles in response to determining that the collision possibility exists;
a lamp configured to turn on or flicker in response to a control instruction of the processor, and
a sound outputter configured to output a sound in response to a control instruction of the processor.

10. The vehicle of claim 9, wherein:
the communicator is configured to receive current location information, and
the processor is further configured to:
   obtain surrounding environment information based on the received current location information, pre-stored map information, and the image information for the surrounding image;
   determine a parking environment state based on the obtained surrounding environment information; and
   determine the collision possibility with other vehicles based on the parking environment state and the location information of other vehicles.

11. The vehicle of claim 10, wherein the processor is further configured to:
determine whether a current location is a parking lot or a road based on the received current location information and the pre-stored map information;
obtain the surrounding environment information of the parking lot based on the image information for the surrounding image and the map information in response to determining that the current location is the parking lot; and
obtain the surrounding environment information of the road based on the image information for the surrounding image and the map information in response to determining that the current location is the road.

12. The vehicle of claim 10, wherein the processor is further configured to:
obtain user's location information based on a received signal strength when communicating with the remote controller;
generate moving route information of a user based on the user's location information and the surrounding environment information, generate driving route information of other vehicles based on the location information of other vehicles and the surrounding environment information, and determine the collision possibility with other vehicles based on the moving route information of the users and the driving route information of other vehicles.

13. The vehicle of claim 10, wherein the processor is configured to:
obtain user's location information based on a received signal strength when communicating with the terminal;
generate moving route information of a user based on the obtained user's location information and the surrounding environment information;
generate driving route information of other vehicles based on the location information of other vehicles and the surrounding environment information; and
determine the collision possibility with other vehicles based on the moving route information of the user and the driving route information of other vehicles.

14. The vehicle of claim 10, wherein the processor is further configured to:
obtain location information of the terminal from the terminal when communicating with the terminal;
generate moving route information of a user based on the location information of the terminal, generate driving route information of other vehicles based on the location information of other vehicles and the surrounding environment information; and
determine the collision possibility with other vehicles based on the moving route information of the user and the driving route information of other vehicles.

15. The vehicle of claim 9, wherein the processor is further configured to transmit the notification information for the collision to the terminal in response to determining that the collision possibility exists.

16. The vehicle of claim 9, further comprising:
a braking device;
a steering device; and
a power device,
wherein, the processor is further configured to:
   in response to determining that the collision possibility with other vehicles exists, recognize a safe riding area based on the received current location information, pre-stored map information, and the image information for the surrounding image; and
   control at least one of the braking device, the steering device and the power device to be moved to the recognized safe riding area.

17. The vehicle of claim 9, wherein the communicator is configured to:
communicate with other vehicles and a server; and
receive the location information of other vehicles from the other vehicles or receive the location information of other vehicles from the server.

* * * * *